United States Patent [19]

Pezzolo et al.

[11] Patent Number: 4,575,659

[45] Date of Patent: Mar. 11, 1986

[54] SENSOR TIMER FOR LAMPS

[75] Inventors: Donald E. Pezzolo, Cupertino; James W. Pfeiffer, Santa Clara; Thomas E. Corder, Martinez, all of Calif.

[73] Assignee: Intermatic Electronics Incorporated, Spring Grove, Ill.

[21] Appl. No.: 499,133

[22] Filed: May 31, 1983

[51] Int. Cl.$^4$ .................................. H05B 41/36
[52] U.S. Cl. .................................. 315/159; 315/157; 315/DIG. 4; 315/360
[58] Field of Search .............. 315/159, 360, 194, 157, 315/156, DIG. 4; 250/205, 214

[56] References Cited

U.S. PATENT DOCUMENTS

| | | | |
|---|---|---|---|
| 3,979,601 | 9/1976 | Franklin | 315/194 X |
| 4,151,515 | 4/1979 | Pease et al. | 315/293 |
| 4,198,574 | 4/1980 | Price et al. | 315/360 X |
| 4,354,120 | 10/1982 | Schornack | 315/360 X |

OTHER PUBLICATIONS

R. A. Pentold, Dusk to Dawn Switch.

*Primary Examiner*—David K. Moore
*Attorney, Agent, or Firm*—Alan H. MacPherson; Steven F. Caserza; Richard Franklin

[57] ABSTRACT

A sensor timer is provided for automatically turning on and off a lamp or alternatively for allowing the lamp to be manually turned on and off using the switch normally associated with the lamp. The sensor timer automatically senses the arrival of nighttime despite seasonal variations in the actual time of nightfall and automatically turns on the lamp a first selected time period after nightfall. The lamp is then automatically turned off a second selected time period after the lamp has been turned on or alternatively is turned on and off randomly during the second selected time period. The sensor timer can also dim the lamp. The sensor timer converts from automatic mode to manual mode in response to the turning on of the lamp through its manual switch thereby to allow the lamp to be controlled directly by the manually operated lamp switch. To convert the sensor timer from manual mode to automatic mode the lamp switch is turned on, off and on in rapid succession. The lamp then comes on for a brief period to inform the user that the sensor timer has been successfully converted to the automatic mode of operation.

19 Claims, 12 Drawing Figures

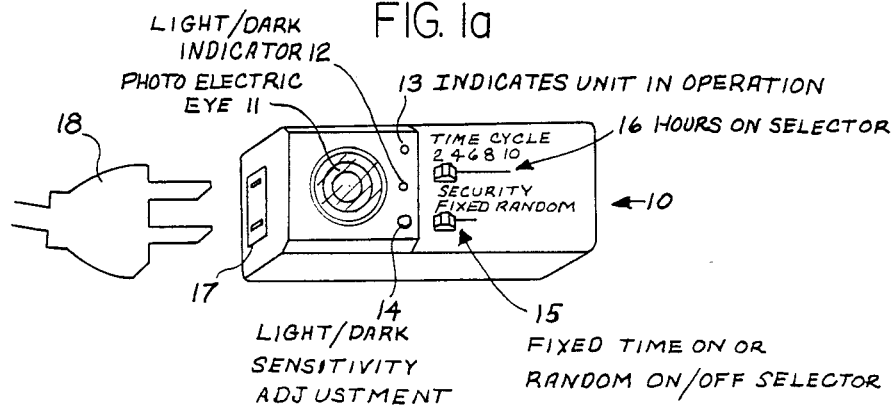
FIG. 1a
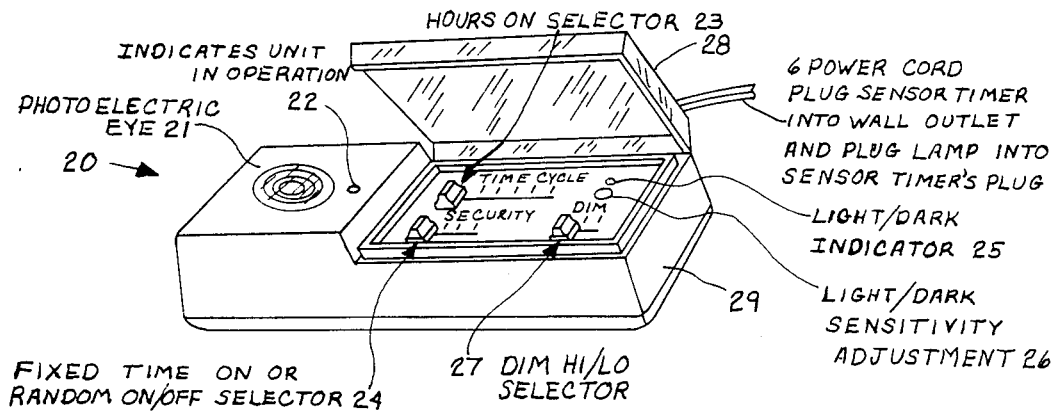
FIG. 1b
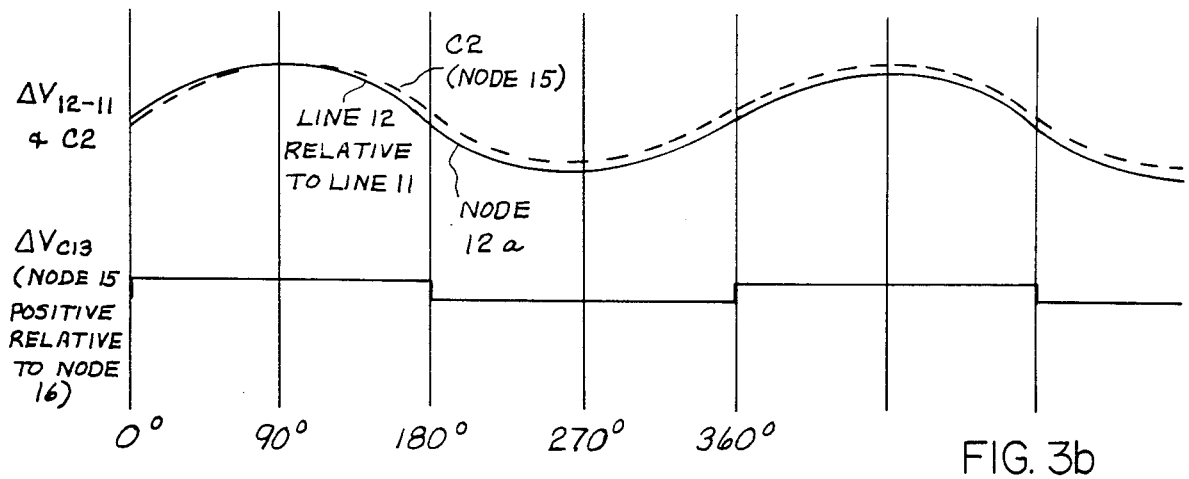
FIG. 3a
FIG. 3b

SENSOR TIMER FOR LAMPS

BACKGROUND OF THE INVENTION

1. Field of the Invention

This invention relates to a light switch and in particular to a solid-state light switch designed to control automatically lamps such as table and floor lamps.

2. Prior Art

The use of timers for turning on and off lights to simulate the occupancy of rooms and homes is well known. Numerous patents have issued describing such structures. Thus, U.S. Pat. No. 3,979,601 issued Sept. 7, 1976 discloses a combination dimmer and timer switch mechanism which is capable of turning on and off the power to a plug-in receptacle in accordance with a predetermined time switch. U.S. Pat. No. 4,151,515 issued Apr. 24, 1979 discloses a similar structure which not only reduces energy consumption by turning lights off after business hours, but also cycles lights in a predetermined manner to discourage burglaries. These structures are limited in that the pattern set for one day repeats on adjacent days unless the system is reset daily. Accordingly, a system designed to simulate occupancy can, by its precise repetitiveness, indicate to a keen observer that the building is not occupied.

In addition, occupants of buildings typically dim lights as well as turn them on and off. Prior art programmable switches which lack this ability are unable to simulate accurately the occupancy of a building.

Co-pending application Ser. No. 408,330 filed Aug. 16, 1982 and assigned to Security Switch, Ltd., discloses an invention which randomly turns on and off a light within a selected range of a desired time and also is capable of being programmed to dim the light at prearranged times to simulate accurately the occupancy of the building. However, the prior art switches including the switch described in the co-pending application Ser. No. 408,330 require adjustment to reflect the seasonal changes in the time of nightfall.

SUMMARY OF THE INVENTION

This invention overcomes the above disadvantage of the prior art switches and provides a switch which automatically senses nightfall thereby eliminating the requirement that a user reset the light turn-on time periodically to compensate for the seasonal changes in daylight or for power interruptions.

In accordance with this invention a sensor timer is provided which senses the darkness of nightfall to turn on a selected lamp.

The sensor timer of this invention is provided in two embodiments. A first embodiment uses a wall outlet and is particularly adapted for use in wall outlets which are exposed to natural light and darkness. A second embodiment suitable for mounting on a surface such as a table top is particularly useful when wall outlets are hidden by curtains or furniture. The second embodiment mounts on a table top, for example.

The wall outlet embodiment contains an indicator for showing that the unit is in either automatic or manual operation, a light/dark indicator which shows whether the switch thinks it is light or dark, a photoelectric eye, and a light/dark sensitivity adjustment which controls the darkness threshold at which the switch thinks it is dark. The unit also contains an "hours on" selector which controls the length of time the switch will leave on a light, and a fixed time on or random on/off selector ensuring that the light will either be on for a fixed time or will cycle randomly on and off for that fixed time. The light serves as a load in the sensor circuit. In one embodiment the unit is particularly adapted for use with up to 300 watt incandescent lamps only and is not appropriate for use with fluorescent applicances or radios because the sensor uses a Triac switch which could introduce a D.C. signal component which would heat or otherwise disrupt these other loads. The use of other switching means will allow the sensor/timer of this invention to turn on and off fluorescent lights, radios, appliances and other electrical apparatus.

The second embodiment (which is adapted to mount on a table) includes an hours-on selector and a fixed-time-on or random-on/off selector. The unit also includes an indicator to show that the unit is in operation, a light/dark indicator, a light/dark sensitivity adjustment and a photoelectric eye (also called a "photocell") to sense the ambient light level. An additional feature of the second embodiment is a dim high/low selector to provide energy savings.

The units are completely solid-state and therefore reliable, compact and quiet. Uniquely, the units require no resetting after power failure.

This invention will be more fully understood in conjunction with the following detailed description taken together with the following drawings.

DESCRIPTION OF THE DRAWINGS

FIG. 1a shows an isometric view of the wall outlet embodiment of this invention;

FIG. 1b shows an isometric view of the table top embodiment of this invention;

FIGS. 3a and 3b illustrate waveforms of use in understanding the operation of the circuitry of FIG. 2.

DETAILED DESCRIPTION

Figure 2:
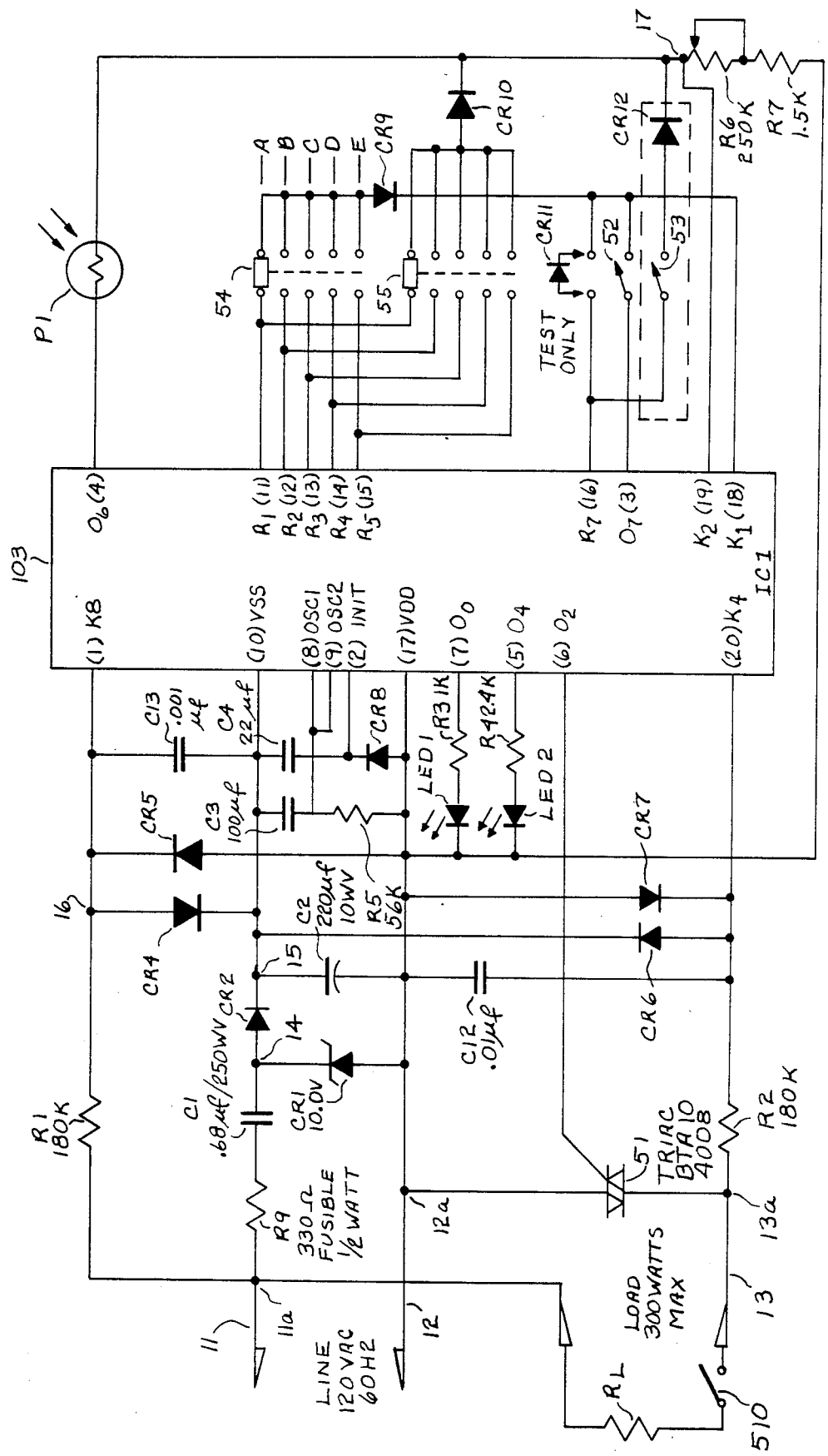
FIG. 2 illustrates the circuit diagram for the electronic circuitry utilized in accordance with this invention.

The following description is meant to be illustrative only and not limiting. While one embodiment of the circuitry of this invention will be described, other embodiments of this invention will be obvious in view of the following description.

FIG. 1a is an isometric view of the wall outlet embodiment of this invention. The wall outlet model 10 includes a housing in which openings are provided for a photocell 11 to sense the amount of ambient light or darkness in the room. Light/dark indicator 12 produces an output signal to indicate that the structure has sensed a dark room. To keep the unit from cycling on and off in response to the photocell 11 sensing darkness, turning on a light and then sensing that the room is light and thus turning off the light, the unit includes means to maintain the light on once the circuit enters its automatic cycle after dark. This means is described below. Light 13 indicates that the unit is in operation (i.e., operating automatically to turn on and off a light in accordance with a preprogrammed schedule) and adjustment screw 14 provides a light/dark sensitivity adjustment (i.e., adjusts the darkness threshold at which the unit thinks it is dark) in a manner to be described shortly. Hours ON selector 16 allows the user to select the number of hours that the lamp controlled by the unit is to remain on while selector 15 allows the user to select whether or not the time that the lamp is to remain on is to be fixed or is to turn on and off randomly over a fixed time period.

A receptacle 17 for electric line plug 18 is provided on the left side of the unit 10 as shown. Plug 18 attaches to an electric cord connected to a lamp (not shown in FIG. 1a)containing an incandescent light bulb of up to 300 watts to allow unit 10 to control this light bulb.

FIG. 1b illustrates an isometric view of a second embodiment of this invention suitable for use on a table top or similar surface when the wall outlet is obscured by a couch or a curtain or a similar object. The embodiment of FIG. 1b contains a light 22 to indicate that the unit is in operation (i.e., operating automatically to turn on and off a lamp in accordance with a preprogrammed schedule), a photocell 21 to sense the amount of light in the room, a light/dark indicator 25 to show whether the unit 20 thinks the room is light or dark, a light/dark sensitivity adjustment dial 26 to adjust the threshold of darkness at which the unit 20 thinks it is dark and a dim high/low selector button 27 to promote energy saving by dimming the turned-on lamp. In addition, an hours ON selector 23 allows the user to select the amount of time the light will remain on, and a fixed time ON or random ON/OFF selector 24 allows the user to randomize the times that the lamp will be turned on and off during the time that the lamp would otherwise be turned on. The unit 20 also contains a lift cover 28 to protect the switches 23, 24 and 27 and the light/dark sensitivity adjustment knob 26 and prevent them from being moved inadvertently. Cover 28 is hinged at the back of base 29 and folds down onto base 29 so as to form a smooth surface with the portion of unit 20 containing photocell 21.

FIG. 2 illustrates the circuitry in the structures of FIGS. 1a and 1b. The heart of FIG. 2 is a microprocessor 103. In the structure of FIG. 2, an input signal which typically comprises the AC line signal of 60 cycles and 115 volts (hereinafter called the "AC Power Line") is applied across lines 12 and 11. If line 11 connected to node 11a is taken as ground, then the line signal is applied through lead 12 to node 12a. As the input signal at node 12a increases in voltage relative to the voltage on node 11a, zener diode CR1 becomes forward biased and conducts current from node 12a through diode CR1 to node 14. Current thereby flows through resistor R9 (330 ohms) and charges capacitor C1 (0.68 μf) such that the voltage on node 14 becomes positive relative to the voltage on node 11a. Capacitor C2 (220 μf) initially is not charged. As the voltage on node 12a increases, current flows onto capacitor C2 ot charge C2. Capacitor C2, however, is relatively large and thus the voltage across capacitor C2 does not change materially during the first half cycle of the AC line signal. Diode CR2 whose anode is connected to node 14 and whose cathode is connected to node 15 to which is connected one plate of capacitor C2 (the other plate of which is connected to node 12a) is back biased thereby providing a high impedance to the flow of current. Likewise, diode CR4, the cathode of which is connected to node 15 and the anode of which is connected to node 11a through resistor R1 (180K ohms) is also backbiased and thus also presents a high impedance to the flow of current during this portion of the cycle. During the first half of the cycle when the voltage on node 12a is positive relative to the voltage on node 11a, diode CR5 is forward biased thus limiting the maximum voltage across capacitor C13 from node 15 to node 16 to about 0.7 volts. Accordingly capacitor C13, connected in parallel to diode CR4 between node 15 and node 16, connected to one lead of resistor R1 charges relatively quickly to about 0.7 volts, the voltage drop across a forward biased pn junction with node 15 being positive relative to node 16.

FIG. 3a illustrates the voltage difference from line 12 to line 11 for one and a half cycles of the power supply signal.

The voltage on capacitor C1 from node 14 to node 11a follows the voltage between nodes 12a and 11a or between lines 12 and 11 as shown in FIG. 3a. Thus during the first quarter cycle of the power supply signal, capacitor C1 (which in series with resistor R9 has a time constant of about 0.22 milliseconds compared to the 16.7 millisecond period for the line signal) tracks the line voltage. However, after the power supply signal on node 12a reaches its maximum voltage relative to node 11a, the voltage on node 12a begins to drop. As shown in FIG. 3a this occurs 90 degrees into the cycle. At this time, diode CR1 becomes back biased by the voltage across capacitor C1 from node 14 to node 11a. The voltage on node 12a then drops relative to the voltage on node 14. Diode CR2 becomes forward biased and the charge on capacitor C1 is dumped onto capacitor C2 thereby charging node 15 to a positive voltage relative to the voltage on node 12a. As the voltage on node 12a drops relative to the voltage on node 14, zener diode CR1 breaks down when the voltage difference between node 14 and node 12a becomes 10 volts. Because capacitor C2 is about 325 times larger than capacitor C1, for the first few cycles of the line signal after the system is turned on, capacitor C2 is not fully charged to 9.3 volts (about ten (10) volts). Consequently, it takes several cycles of the AC line signal before C2 provides a ten volt power supply to microprocessor 103. Thus for the first few cycles of the AC line signal across nodes 12a and 11a, zener diode CR1 does not break down. But once the system reaches steady state operation, the zener diode CR1 breaks down when the line voltage in the second quarter cycle has dropped about 10 volts relative to the maximum charge across capacitor C1. When diode CR1 breaks down, diode CR2 becomes back biased such that node 15 is held at about 10 volts above node 12a. Accordingly, capacitor C2 provides a 10 volt DC signal to the VSS lead to microprocessor 103 relative to the VDD lead.

During operation should the voltage across capacitor C2 drop beneath 9.3 volts, diode CR2 becomes forward biased during the last three-quarters of each cycle of the AC line signal and thereby allows sufficient additional charge to be transferred from capacitor C1 to capacitor C2 to bring the voltage level on capacitor C2 up to the power supply voltage for microprocessor 103 of about 9.3 to 9.4 volts. Indeed at any time during the cycle should the voltage on node 15 become less than about 9.3 volts above the voltage on node 12a, capacitor C1 provides charge sufficient to recharge capacitor C2 to a voltage such that node 15 is about 9.3 volts above node 12a. The difference between the dashed line in FIG. 3a labeled C2 and the solid line labeled node 12a shows the voltage difference of about 9.3 volts between the voltage on node 12a and line 12 and the voltage on node 15. Thus the ten (10) volt (i.e., 9.3 volts) DC supply voltage remains substantially constant but the base level varies with the line voltage at the line frequency. Microprocessor 103 merely sees the difference of about 10 volts across leads VSS and VDD.

During the first quarter cycle of the line signal on line 12, diode CR5 becomes forward biased and thereby allows the voltage on node 16 to track the voltage on node 12a less the voltage drop of 0.7 volts across a forward biased pn junction. Because node 15 is held at about 10 volts above the voltage on node 12a,, as described above, the capacitor C13 is also charged to approximately 10 volts (node 15 positive relative to node 16) and held there during the positive half cycle of the power supply voltage. However, when the power supply voltage on node 12a goes negative relative to the voltage on node 11, the voltage on node 15, which is about 10 volts above the voltage on node 12a but which tracks this voltage, drops negative relative to node 11a. At this point, diode CR4 becomes forward biased by the drop of the voltage on node 15 beneath the voltage on node 11a and current flows through resistor R1 to discharge capacitor C13. Capacitor C13 (0.01 microfarad) has a time constant of about 1.8 milliseconds in series with resistor R1. Diode CR4 is forward biased thereby clamping the voltage drop from node 16 to node 15 on capacitor C13 during this portion of the cycle to the voltage drop across one forward biased pn junction. Thus the voltage across capacitor C13 from lead VSS to lead K8 to microprocessor 103 drops from 9.3 volts to −0.7 volts (measured from node 15 to node 16). This waveform is shown in FIG. 3b. As shown in FIG. 3b, the voltage across capacitor C13 remains at about 10 volts for one half cycle and then drops to substantially ground voltage for the other half cycle. The leading and trailing edges of this pulse provide to microprocessor 103 an indication of the zero crossing of the AC power supply signal on leads 11 and 12.

In the preferred embodiment, microprocessor 103 is the well-known four bit TMS 1700 made by Texas Instruments. Of course, other microprocessors can be used instead of the TMS 1700 if desired.

A load such as an incandescent lamp $R_L$ is connected between node 11a and node 13a. Triac S1 is connected between nodes 12a and 13a with the trigger of triac 51 connected to the lead $O_2$ from microprocessor 103. In the absence of a trigger signal from microprocessor 103 on lead $O_2$ in response to a signal from the program controlling microprocessor 103, triac S1 remains off and thus provides a high impedance between nodes 12a and 13a. When, however, a trigger signal is received from microprocessor 103, triac S1 turns on thereby providing a low impedance between nodes 12a and 13a and allowing sufficient current to flow through lamp $R_L$ to turn on this lamp. Triac S1 will turn on either for every half cycle of the line current or every other half cycle of the line signal thereby in the latter case to provide one-half the power to the load $R_L$ and thus dim the light.

The load $R_L$ is connected in series with switch S10 between nodes 11a and 13a. Switch S10 can comprise the normal lamp switch used with a lamp or a wall switch or any switch in series with an electrical appliance supplying load $R_L$. When switch S10 is open, the impedance seen by the circuit is very high. When switch S10 is closed the impedance seen by the circuit comprises the impedance $R_L$ of the incandescent bulb. The impedance $R_L$ of an incandescent bulb varies from about 50 ohms for a 300 watt bulb to about 500 ohms for a 30 watt bulb.

If switch S10 is not available or provided, the structure of this invention can still be used with a light source such as an incandescent lamp but, as will be seen later, will always function in its automatic mode.

During the positive half cycle, current flows through diode CR7, resistor R2 (180k ohms) and the load resistor $R_L$ from node 12a to node 11a. When switch S10 is open no current flows and the microprocessor senses on lead K4 the absence of a voltage drop across resistor R2. When switch S10 is closed, the microprocessor detects the voltage at node 13a thereby producing a voltage on lead K4 to microprocessor 103. Resistor R2 functions as a current limiter. Thus the voltage on lead K4 to microprocessor 103 is approximately ten (10) volts during the positive half cycle of the AC line signal when the switch S10 is closed and approximately zero volts during the negative half cycle of the AC line signal. Capacitor C12 (0.001 mf) acts as a filter to prevent high frequency noise from erroneously indicating the presence of a load to lead K4. Diode CR6 insures that the voltage on K4 at no time exceeds the voltage on node 12a by an excess of 10 volts and thus protects microprocessor 103 from receiving the full line voltage of the AC line signal.

Current limiting resistor R4 and LED 2 provides a visible indication to the user when the system is turned on to "automatic" operation. During this time current flows from lead 5 through resistor R4 and LED 2 returning to VDD lead 17 of microprocessor 103. Current limiting resistor R3 and LED 1 indicate when the system thinks it is dark. The setting of variable resistor R6 (500k ohms) in series with photocell P1 and resistor R7 (1.5k ohms) controls the threshold at which the microprocessor 103 thinks it is dark. Thus when LED 1 comes on, the user obtains a visible indication by the illumination of LED 1 of when the system thinks it is dark.

Switches S4A, S4B, S4C, S4D and S4E provide the opportunity to turn a light on two hours, four hours, six hours, eight hours and ten hours, respectively following the detection of darkness. As will be shown later, the system waits a specified time (typically ten minutes) to prevent temporary periods of darkness from affecting the system.

Switches S2 and S3 select when the system will operate on a random basis or fixed time basis and when the system will operate with full brightness or in the dim mode, respectively. Switch S3 is available only on the table model of this invention shown in FIG. 1b.

Diode CR11 provides a circuit which speeds up the timing of the various sequences in the program operating the microprocessor to the extent that two hours of time can be made to elapse in ten seconds. This allows the microprocessor to be tested through one full cycle in a much shorter time than it would take if the microprocessor was operated in real time.

Photocell P1 (a variable impedance device) connected between leads $O_6$ and VDD (ground) of the microprocessor detects the presence or absence of light and thus provides a signal to the microprocessor of darkness. This photocell is connected in series with variable resistor R6 and resistor R7 (1.5K ohms).

The sensor will automatically control the on/off status of the lamp (represented by impedance $R_L$ in FIG. 2) during the evening and nighttime hours. Once the photocell (P1 of FIG. 2) senses that it is dark the sensor will make sure that it is dark for ten full minutes before the sensor does anything. This prevents intermittent dark/- light periods from starting a cycle. This feature is available in both the wall and the table model.

An additional feature called "delay turn-on" (shown as switch S5 in FIG. 2) allows the user to select a delay of 0, 1, 2, 3 or 4 hours in the turn-on of the light after the photocell senses that it is dark.

After ten minutes the sensor will load into memory, the "on time" (i.e., the time period which the sensor must wait before turning on after detecting darkness). This "on-time" can be controlled by the user by a switch (S4 in FIG. 2 and switches 16 and 23 in FIGS. 1a and 1b) on the front panels of the units 10 and 20. This switch on the front panel can be set for 2, 4, 6, 8 or 10 hours duration thereby to determine the time that the light will remain on once turned on. The light however is only turned on after a given delay (as described above) has elapsed following the receipt from the photocell 11 (FIG. 1a) or 21 (FIG. 1b) or P1 (FIG. 2) of a signal indicating that the room has become dark.

The unit has a security feature which randomly turns off the light and then turns back on the light again during its normal "on-time". The randomly selected "on times" range from 20 to 60 minutes. The randomly selected "times" range from 10 to 20 minutes.

The sensor also has an LED (shown as LED 12 in FIG. 1a and LED 22 in FIG. 1b and LED 1 in FIG. 2) which comes on when the photocell 11, 21, P1 produces a signal indicating the room is dark. As described above, this LED must remain on for 10 minutes before the sensor timer will turn on a light connected to it. Once the sensor timer turns on a light, photocell 11 (FIG. 1a), 21 (FIG. 1g) or P1 (FIG. 2) will sense that the room is light. However, once the light turns on the system is programmed to go through its full cycle keeping the light on for the designated time set by switches 16 (FIG. 1a), 23 (FIG. 1b) or 54 (FIG. 2) and the photocell P1 has no influence on the operation of the unit for the remainder of the cycle.

On completion of one cycle, the photocell P1 has to see light for ten minutes (to ensure daylight has arrived) before it will start the cycle again. Should another light not controlled by the sensor timer of this invention be turned on in the room, the photocell 11,21, P1 would sense this light and be unable to distinguish this light from sunrise and thus after ten minutes would reset the system to again detect darkness as though another day had been completed. The ten minute delay is selected (and any other appropriate delay could be used) to prevent headlights from cars on the highway, lightning, or people turning lights on to go to the bathroom or to the kitchen for food, from resetting the system.

Once the sensor timer turns on its own light, the sensor is programmed so that the internal circuitry stops looking at the photocell 11, 21, or P1. The random mode of operation turns the light on and off randomly during the set on-time. During the operation of the random mode, the circuit ignores the signals from the photocell 11, 21 or P1. Only upon the completion of the "on-time" cycle and the presence of light for ten minutes indicating a new day does the signal from the photocell 11, 21 or P1 again become observed by the circuit.

The sensor timer also has an "auto mode" indicator shown as 13 (FIG. 1a), 22 (FIG. 1b) and LED 2 (FIG. 2). This indicator turns on when the sensor is in the automatic mode, that is, when the sensor is automatically looking for darkness and light. The indicator light is off when the system is in the manual mode. Note however, that the sensor timer does not have a manual or automatic switch. Instead, as a feature of this invention this mode of operation is selected by the switch S10 (FIG. 2) on the lamp represented by impedance $R_L$. Thus a user can enter a room in which the light is off but the system is in the automatic mode and can manually turn on the a light controlled by the sensor timer of this invention by opening switch S10 and then closing S10. The system will be switched to the manual mode and the light will be on. The turning off and then on of switch S10 will convert the sensor timer from the automatic mode to the manual mode. Turning on, off and on the switch S10 rapidly within a selected time (in one embodiment selected to be three seconds) will convert the sensor timer back from the manual mode to the automatic mode. This feature is particularly important when the sensor is mounted in an inaccessible location such as behind a couch where it cannot be easily seen or reached. Once the sensor is in the automatic mode the light will remain on for a selected time, typically three (3) seconds and then will go off, thus signalling the user that the sensor indeed is in the automatic mode.

The logic for implementing the change from automatic to manual mode and from manual to automatic mode is as follows.

If the light is on and the system is in the automatic mode, to change from automatic to manual mode, the user merely turns off the light and then turns the light on again. When the unit is first plugged into the wall and started up, it prefers the automatic mode and thus "comes up" into operation in the automatic mode. Thus when the unit is plugged into the wall and already has a load connected to it, it will come up in the automatic mode. Should a power failure occur, which is equivalent to the unit being removed from the power socket and then replugged into the socket, the sensor timer will automatically come "back up" in the automatic mode. If the sensor timer has no load plugged into it or, equivalently, if a light is plugged into the sensor timer but the switch (corresponding to S10 in FIG. 2) on the light is turned off, (i.e., opened) it does not matter which way the sensor timer comes up because there is no load on which the sensor timer can operate. However, when the load switch S10 is turned on (i.e., closed), the sensor timer will then switch to the manual mode.

To switch the sensor timer from the manual mode to the automatic mode (the sensor timer is in a "manual-off" state when the light switch S10 is turned off), the user must switch the light on, then off and then on again all within a selected time, typically less than three seconds. If the light is on but the sensor timer is in the manual state, in order to switch the sensor timer from the manual state to the automatic state, the user must turn the light off and then turn the light on, off and on again all within a selected time, typically less than three seconds. If the user mistakenly shuts the light off when the sensor timer is in the manual mode and then wishes to turn the light back on again but keep the sensor time in the manual mode, the user can turn the light on again immediately and the system will again be in the manual mode. Thus, the system must be turned repetitively on, off and on within three seconds in order to make the change from the manual to the automatic mode.

If the user, after having switched the sensor timer into the automatic mode, wishes to turn the light on again manually, the user merely turns the light switch off and then on again and the sensor timer again goes into the manual mode. Each time the sensor timer is in the manual mode, the LED 2 (shown in FIG. 2 as being on to indicate that the sensor time is in the automatic mode) goes off. Merely turning the light on once does not switch the sensor timer from the manual to the automatic mode. The logic thereby prevents the light from automatically being turned off while the user desires to have the light remain on. Thus the system is configured to go into the automatic mode only upon a definite signal from the user.

When the light has been switched on-off-on and thus put into the automatic mode, the light will come on and then go off after three seconds thereby telling the user that the sensor timer is indeed in the automatic mode. This is important because when the wall mounted model is used the user may not be able to see this model and LED 13 (shown as LED 2 in FIG. 2) and can only see the light from the lamp. Thus, the light controlled by the sensor timer tells the user the particular mode of operation of the sensor timer. This is an important feature because many of the prior art timers are not accessible and thus the user is unable to determine the state of these timers or even reach these timers to manually control them.

A threshold adjustment button 14 (FIG. 1a), 26 (FIG. 1b) corresponding to potentiometer R6 (FIG. 2) is provided. This allows the user to adjust the time in the evening at which the cycle starts by adjusting the sensitivity of the photocell 11, 21 or P1 to the degree of darkness Thus, a user can control the timer to turn on earlier or later depending upon the threshold adjustment of the photoelectric eye 11, 21 or P1. The light-/dark or darkness indicator 12 (FIG. 1a) and 25 (FIG. 1b) (corresponding to LED 2 in FIG. 2) is provided with the sensitivity adjustment 14 (FIG. 1a), 26 (FIG. 1b) and R6 (FIG. 2), so that user can come to the sensor, adjust the sensitivity knob until the indicator lamp 12, 25, LED 1 (FIG. 2) just comes on and know that that is the degree of darkness at which the sensor timer will begin the evening cycle.

The switch S5 in FIG. 2 comprises a delay turn on switch which allows the system to delay the turn on time of the bulb by up to 4 hours.

The speed up mode including the diode CR11 basically turns hours into seconds and thus allows the total sequence of states to be adopted by the unit over 24 hours (one cycle under normal circumstances) to be reviewed very quickly. Only the manufacturer or distributor has access to this button to review the operation of the system. This feature is also used not only for testing the product but in demonstrating the product at the retail level.

Next will be described the flow charts for software used to program the sensor of this invention.

DESCRIPTION OF THE FLOW CHARTS FOR THE MICROPROCESSOR SOFTWARE

Figure 4A:
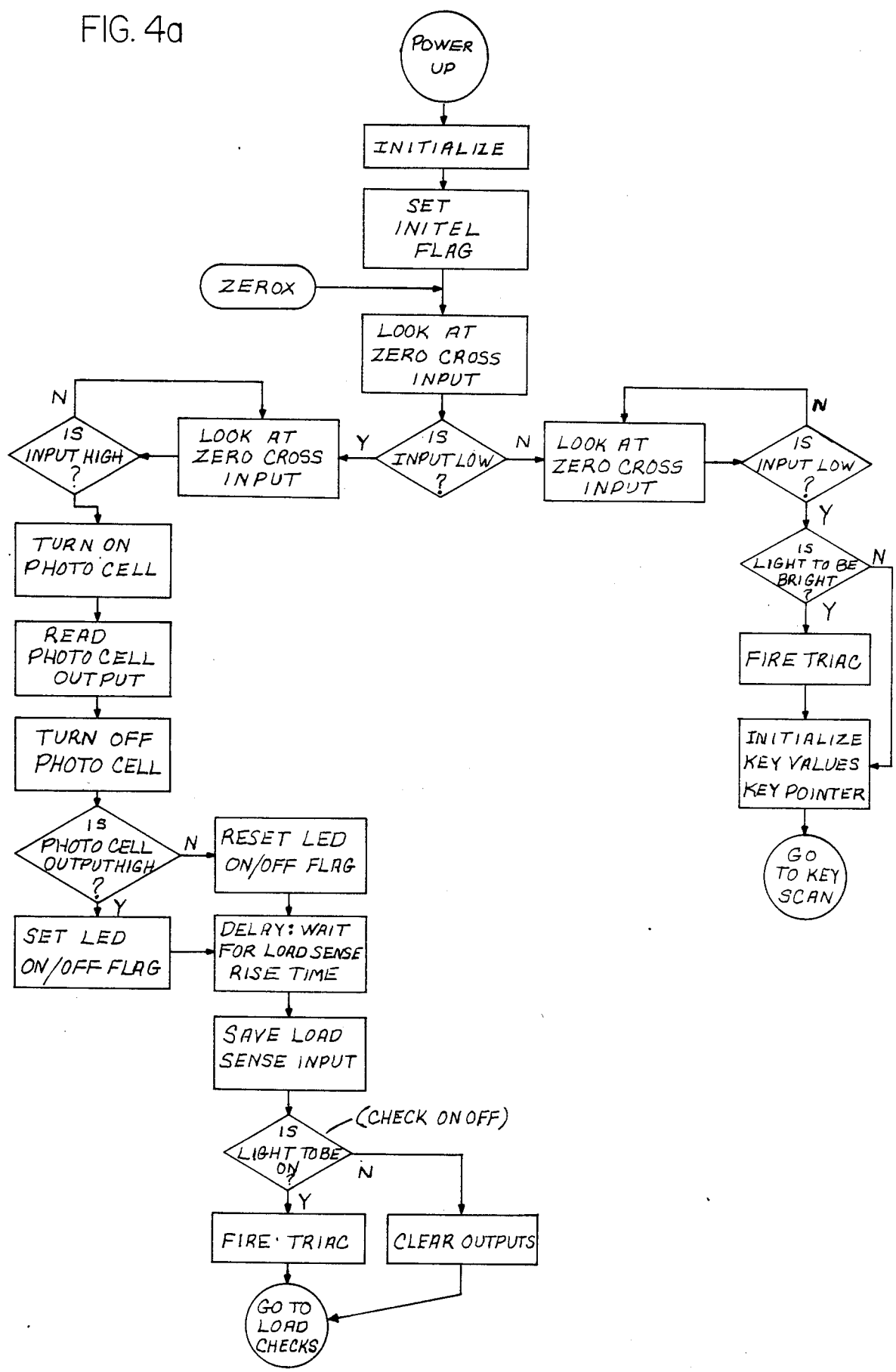
FIGS. 4a through 4g illustrate the logic diagrams for the software used in the microprocessor 103 of FIG. 2.

FIG. 4a. Power Up and Initialize. When the unit "powers up" it will initialize the RAM in microprocessor 103 and set the points and counters. Then the sensor will start its zero cross routine. In this routine, the sensor looks at the zero cross input (lead K8 on microprocessor 103 (FIG. 2) and asks "is the input signal low?" If the zero cross input signal is low, the microprocessor will look again at the zero cross input signal and wait until it goes high. When the microprocessor 103 (FIG. 2) senses a low to high transition on the zero cross input lead K8, the microprocessor will turn on the photocell P1 (FIG. 2), read the impedance of the photocell then turn photocell P1 back off again. If the photocell P1 impedance is high, the microprocessor is programmed to set a flag so indicating. If this impedance is low, the microprocessor will reset this flag as indicated by the reset LED on/off flag box. After this flag is set or reset, the unit will delay and wait for the load sense to come up to voltage. The load sense signal has a rise time slower than that of the zero cross signal and has to be high before it can be detected by the computer. This delay time is on the order of 500 microseconds as determined by capacitor C12 and resistor R2 in FIG. 2. After this delay, microprocessor 103 will read the load sense line K4 (FIG. 2) and record in a register allotted for this purpose whether this line is high or low. The unit will then ask "is the light to be on?" If the answer is "yes", the microprocessor will fire triac, if the answer is "no", the microprocessor will clear the output. In either case it will go to the load check routine.

Figure 4B:
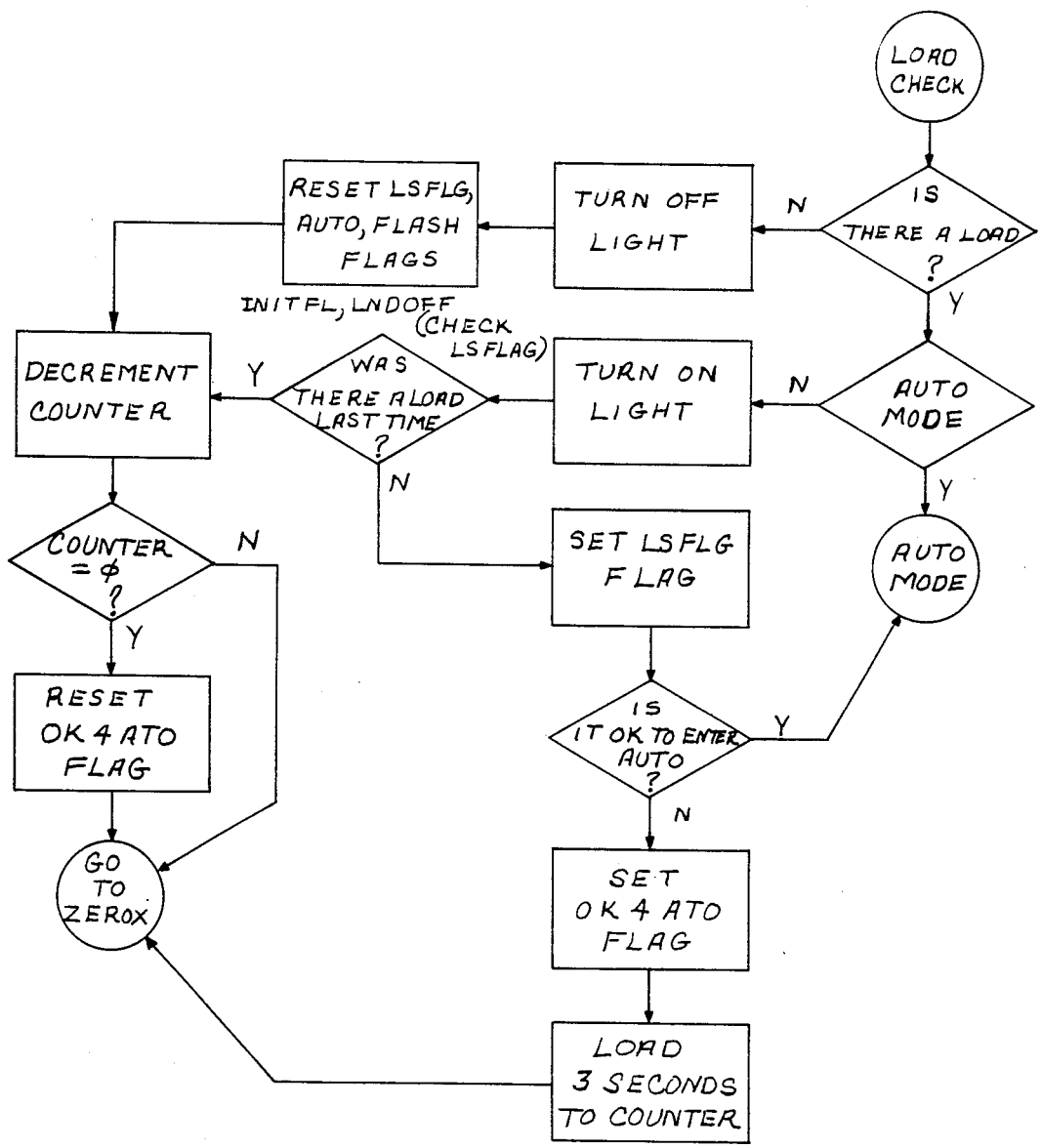

FIG. 4b. The load check routine. The load check routine functions as follows: The microprocessor asks the question "is there a load"? If not it will turn off the light, reset some flags and decrement a counter. When the counter equals zero it will reset a flag called OK-4ATO and go back to the zero cross routine. If there is a load the microprocessor asks if the sensor is in the auto mode. If it is not in the auto mode, the microprocessor will turn on the light and ask if there was a load (i.e., was switch S10 in FIG. 2 closed) the last time through. If there was a load the last time through, the microprocessor will decrement the counter. If the counter is equal to zero, the microprocessor will reset the OK-4ATO flag and go back to zero cross. If the counter was not equal to zero, the microprocessor will just go back to the zero cross routine ZEROX in FIG. 4a). If there was a load and the microprocessor was not in the auto mode, the light is turned on and if there was no load the previous time, it will set a flag called LSFLG and then check the OK4ATO flag to see if it is permitted for it to enter the auto mode. If not, the microprocessor will set the OK4ATO flag, load three seconds into the counter and go to the zero cross routine. If the microprocessor is permitted to enter the auto mode, it will do so. The above routine is used to switch the system from manual to automatic in response to a fast on-off-on of the light switch. Once the system goes into the automatic mode the operation of the software is described by the flow diagrams in FIG. 4c beginning with AUTO.

Figure 4C:
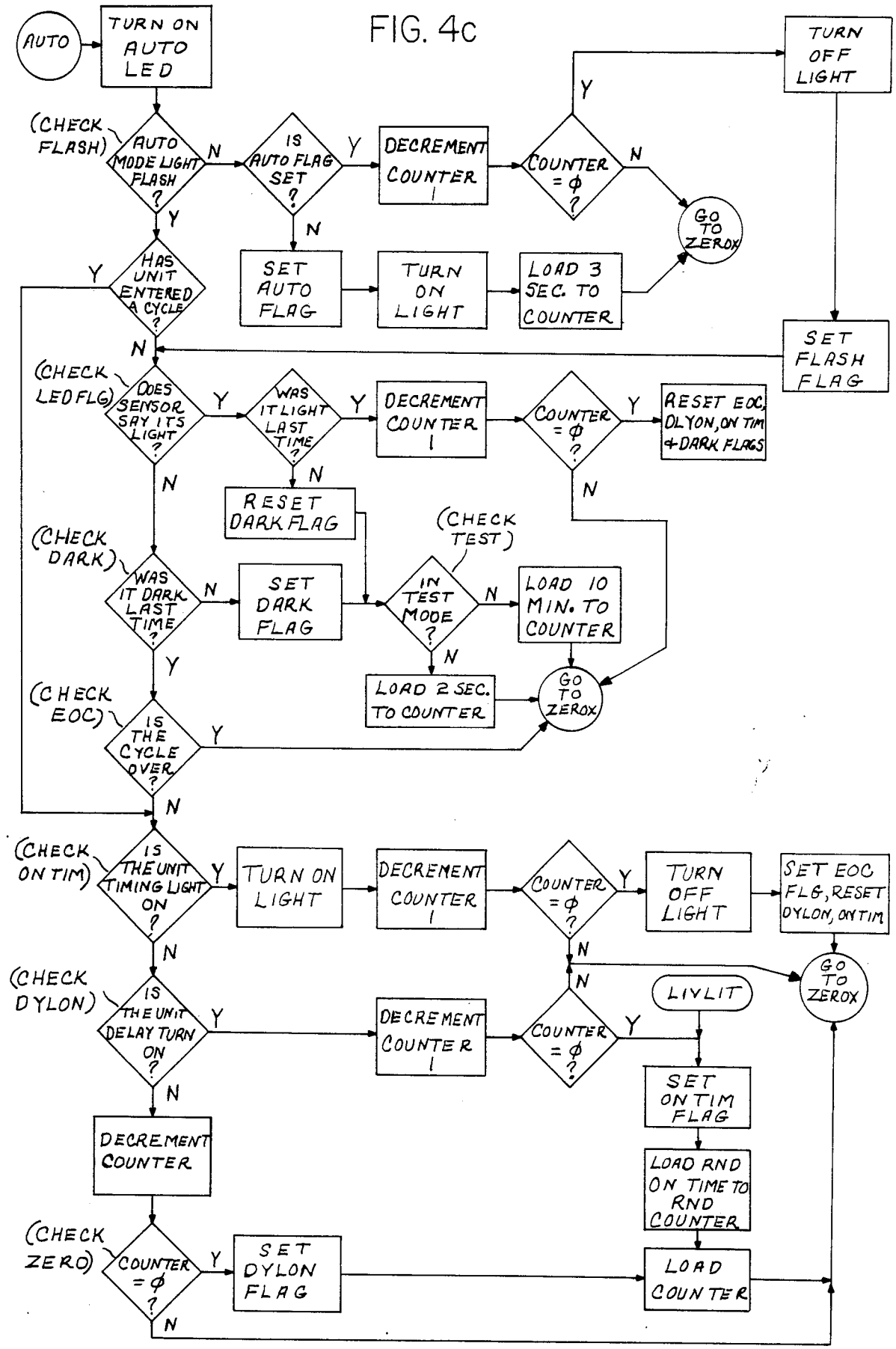

FIG. 4c. Automatic Mode. On entering the automatic mode the automatic LED (LED 1 in FIG. 2) will be turned on. The microprocessor will then check a flag called Flash. The Flash flag not set means the light has not been turned on for its three seconds to indicate that the unit is in the auto mode. The microprocessor will then check to see if the auto flag is set. If not, it will set the auto flag, turn on the light and load three seconds into the counter. The microprocessor will then go to the zero cross routine (ZEROX, FIG. 4a). The next time the microprocessor comes to the auto routine, it will see that the Flash flag is still not set. The microprocessor will see that the auto is will decrement the counter. If the counter is not equal to zero, the microprocessor will return to the zero cross routine (ZEROX C FIG. 4a). The microprocessor will continue in this loop until the counter is equal to zero which indicates that three seconds has elapsed. The microprocessor will then turn off the light (RL in FIG. 2) by no longer triggering the TRIAC (FIG. 2) and set the Flash flag. Then the microprocessor will check the sensor to determine if the room is light. If the room is light, it asks "was it light the time before this loop?" If it was not, the microprocessor will reset the dark flag and ask if the microprocessor is in the test mode. If it is, the microprocessor loads three seconds onto a counter. If it is not, the microprocessor loads ten minutes into the counter. The microprocessor then returns to the ZEROX routine (FIG. 4a). The system now returns to auto (FIG. 4c). If the sensor says again it is light, it will have been light the time before so decrement the counter. When the counter reaches zero it will have timed out the ten minutes (or three seconds) and will reset some flags. Then the microprocessor will return to the zero cross routine. The first time the unit senses dark the microprocessor will set a dark flag and load either ten minutes or three seconds into a counter depending on whether the microprocessor is in the test mode or not. The next time the microprocessor comes through the routine the microprocessor will have sensed that the room is dark. If the cycle is not over, it will conduct two checks for "on time" and "delay on" and begin decrementing the counter. When this counter has been decremented to zero the microprocessor will set a flag indicating delay on and will load the "delay on" counter from the switch on the front controls. The countdown prior to the "delay on" countdown is required to prevent short periods of dark from beginning a cycle. The next time through the routine the microprocessor will drop through the logic to the point where it checks the "delay on" switch and the microprocessor will begin decrementing the "delay on" counter which will be set to zero if the switch on the front panel has not been set to a delay. When this counter gets to zero, it will set an "on time" flag and load a random on time to a random counter. It will then load the "on time" from the switches on the front of the unit and go back to the zero cross routine.

Next time through this program, the microprocessor will drop through the logic to where it begins the on time cycle, at which time it will turn the light on and begin decrementing the counter. When the counter reaches zero, it will turn off the light, reset end of cycle (EOC), Delay On and On Time flags and go back to the zero cross routine. The next time through the microprocessor will go to the box labeled check EOC "is the cycle over". If it is over the microprocessor will go back to the zero cross routine and continue looping until it sees a light. When the microprocessor sees a light, it will go into a service routine that was described earlier where it will check the last light and decrement the counter loading and wait for ten minutes continuous light before it will redo this whole cycle once again. The above described operation of the auto routine will always happen on the first half cycle of the zero cross input after a low to high transition.

At the location ZEROX on FIG. 4a, after the unit looks for the zero cross input signal and sees that the input signal is not low, the microprocessor will repeatedly look at the zero cross input signal and wait until it is low. This will indicate that the microprocessor is in the second half of a power line cycle. The microprocessor will then ask "is the light to be bright"? (See FIG. 4a.) If the light is to be bright the microprocessor will fire the triac. If the light is not to be bright, the microprocessor will skip to initialize key values and a key pointer and go to the key scan routine.

Figure 4D:
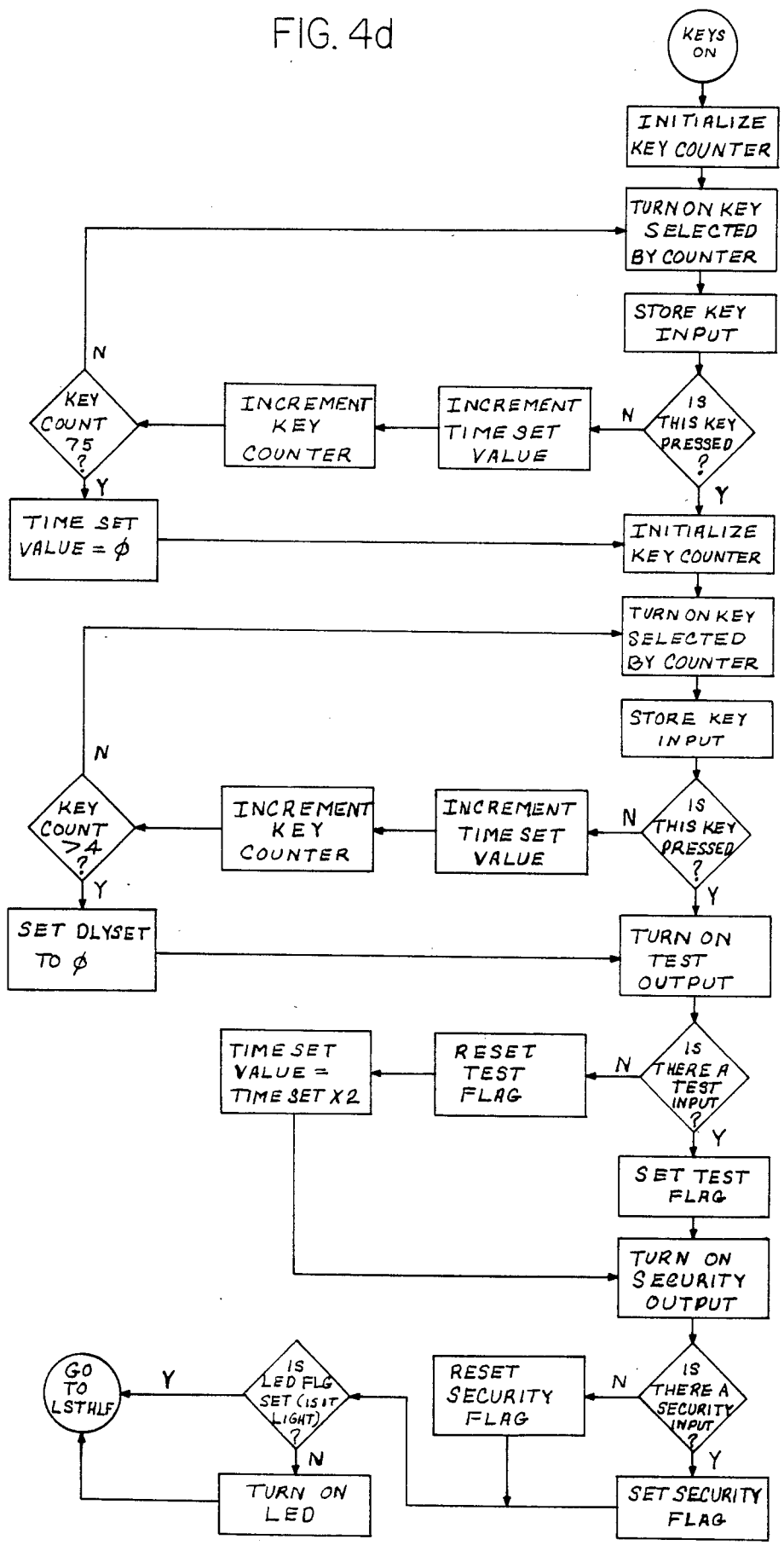

FIG. 4d. Key Scan Routine. The key scan routine will always happen on the second half cycle of the zero cross input. The key scan routine begins by initializing the key counter. The microprocessor will turn on an output selected by the key counter which will selectively turn on outputs R1 through R5 shown on the sensor timer schematic (FIG. 2). The microprocessor will then store inputs coming in on K1 of the schematic. If an input is present it indicates that this switch is selected; if an input is not present, the microprocessor will increment the time set value and increment the key counter. If all five positions of the switch have been looked at but no input found, the microprocessor will set the time set value to zero. The microprocessor then will loop back around, turn on the next key position, store the input and loop back.

When a time set value has been set either at zero or at the value corresponding to the key that was pressed, the microprocessor will initialize a second key counter and then turn on the "delay on" key selected by the counter, store the input and do a routine similar to the time set key routine. This will allow the microprocessor to store the value set on the delay/on switch.

The key scan routine will then check to see that there is a test input. If not, the microprocessor will reset the test flag, multiply the time set value by two and go on to check the security switch. If there is a test input, the microprocessor will set the test flag, and then check the security switch. If there is a security switch input the microprocessor will set the security flag. If there is not a security switch input the microprocessor will reset the security flag. Then the microprocessor will check the LED flag to see that it is set. If the LED is set, the microprocessor will go on to the routine LSTHLF. If the LED flag is not set, the microprocessor will turn on the dark LED. The routine LSTHLF is shown in FIG. 4e.

Figure 4E:
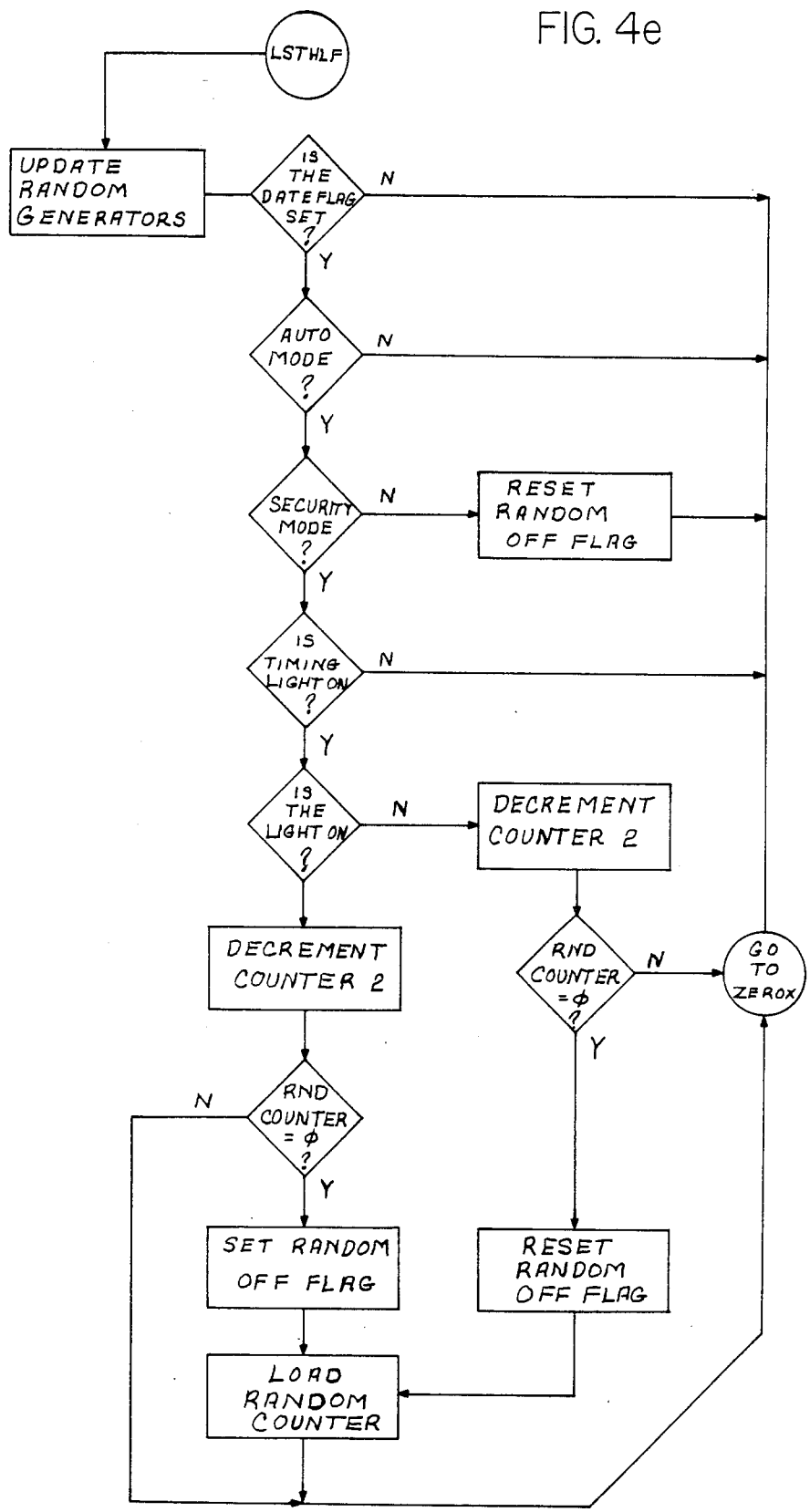

FIG. 4e. LSTHLF. The LSTHLF routine will be executed in the second half cycle of the zero cross input. This routine begins by updating random generator counters. This is done merely by incrementing the counter. The random on-time is incremented from 20 to 60 minutes. The random off-time is incremented from 10 to 20 minutes. The microprocessor will then check the dark flag. If the dark flag is set, the auto mode is set and the security mode is set, and if the microprocessor is also timing the light on and the light is on, the microprocessor will decrement the random counter called Counter 2. If the random counter equals zero, the microprocessor will set a random off flag, load the random counter with an off time and go back to the zero cross program. If the random counter was not zero, the microprocessor will merely go back to the zero cross routine. If the dark flag is set, the auto mode is set, the security mode is set, and is timing light on, but the light is off, the microprocessor will decrement the random counter called Counter 2. If the random counter is zero, the microprocessor will reset the random off flag and load a random on time into the counter and go back to the zero cross routine. If the dark flag is reset or the auto mode is reset, the microprocessor also returns to the zero cross routine. What this routine LSTHLF actually does is merely set a random off flag that will be used in a routine called LITON in FIG. 4g and is used to override the sensor setting in the typical on time duration.

Figure 4F:
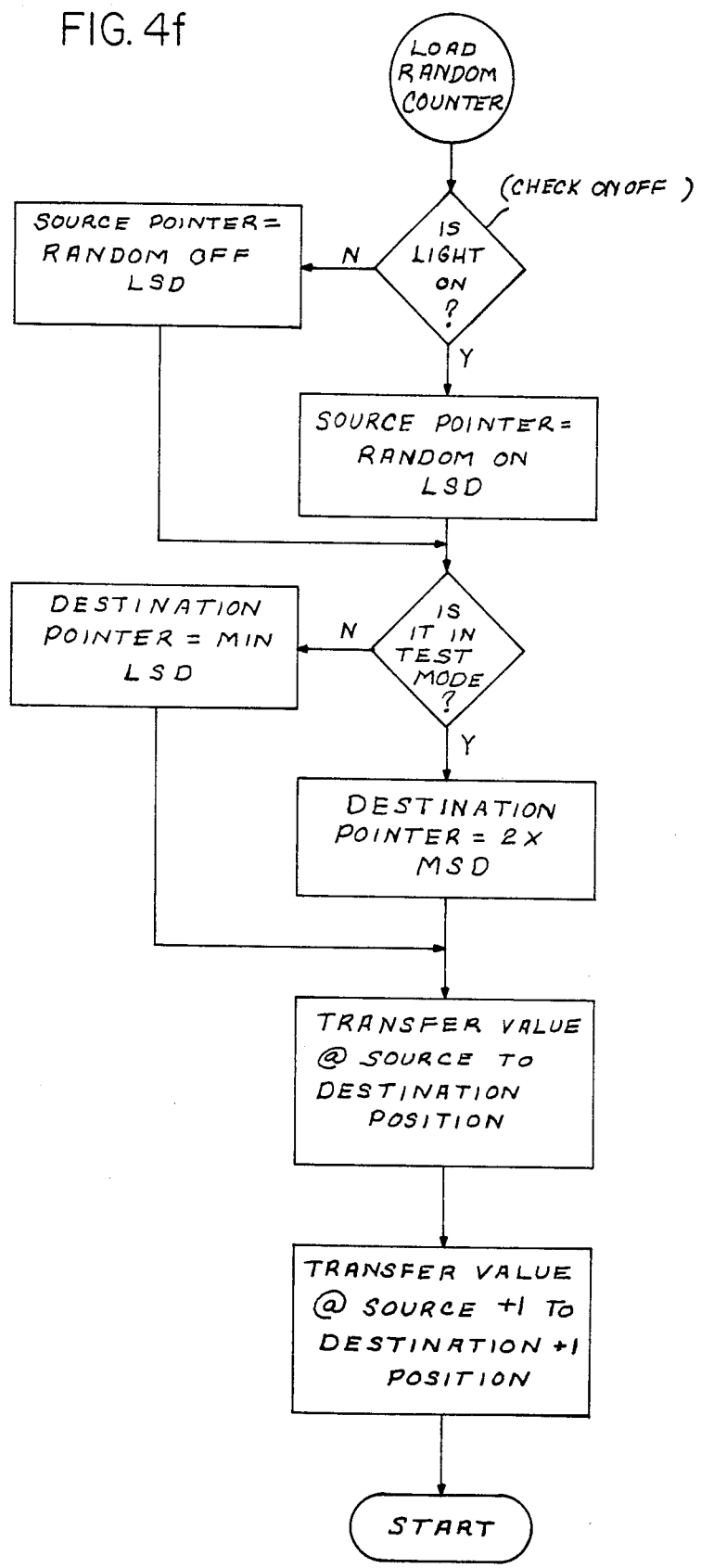

FIG. 4f. Load Random Counter. The routine called load random counter in FIG. 4f is an all purpose routine used by the LSTHLF program in FIG. 4e and will load either the on time or the off time based on whether the light is on or off. This routine will first ask, "is the light on?" If it is not, the microprocessor will load the random off bit into a source pointer. If the light is on, the microprocessor will load the random on time into a source pointer. It will then ask, "is it in the test mode?". If the light is not on, the minutes least significant digit of the random counter will be loaded into a destination pointer. If the microprocessor is in the test mode, the zero cross counter most significant digit of the random counter will be loaded into the destination pointer. The microprocessor will then transfer the value in the source pointer to the value in the destination pointer, thereby transferring the random on or off time to the random counter. It will then proceed to zero cross routine.

Figure 4G:
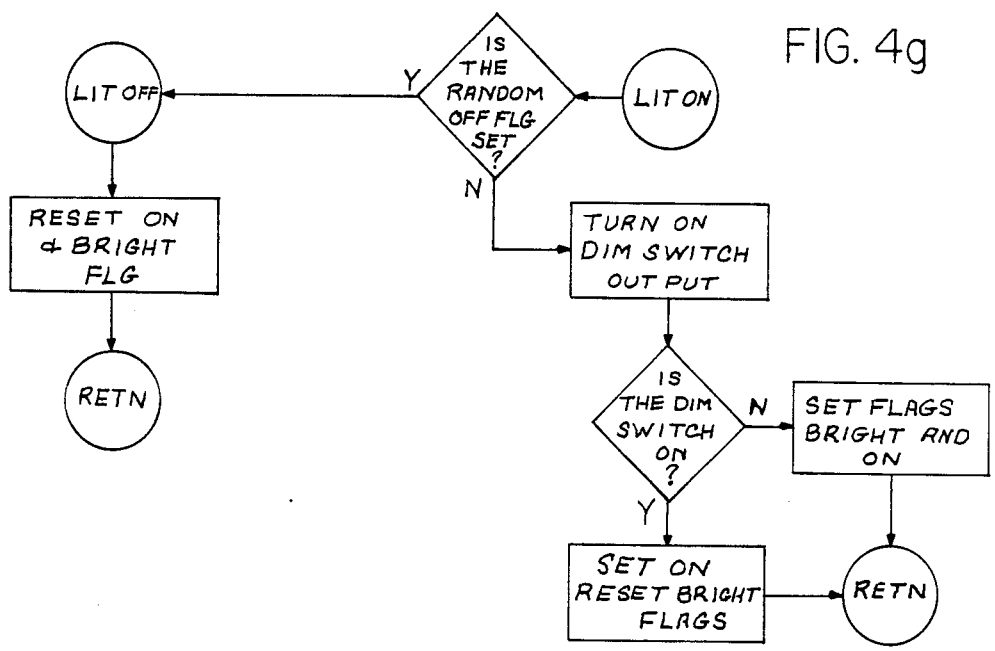
Figure 4G:
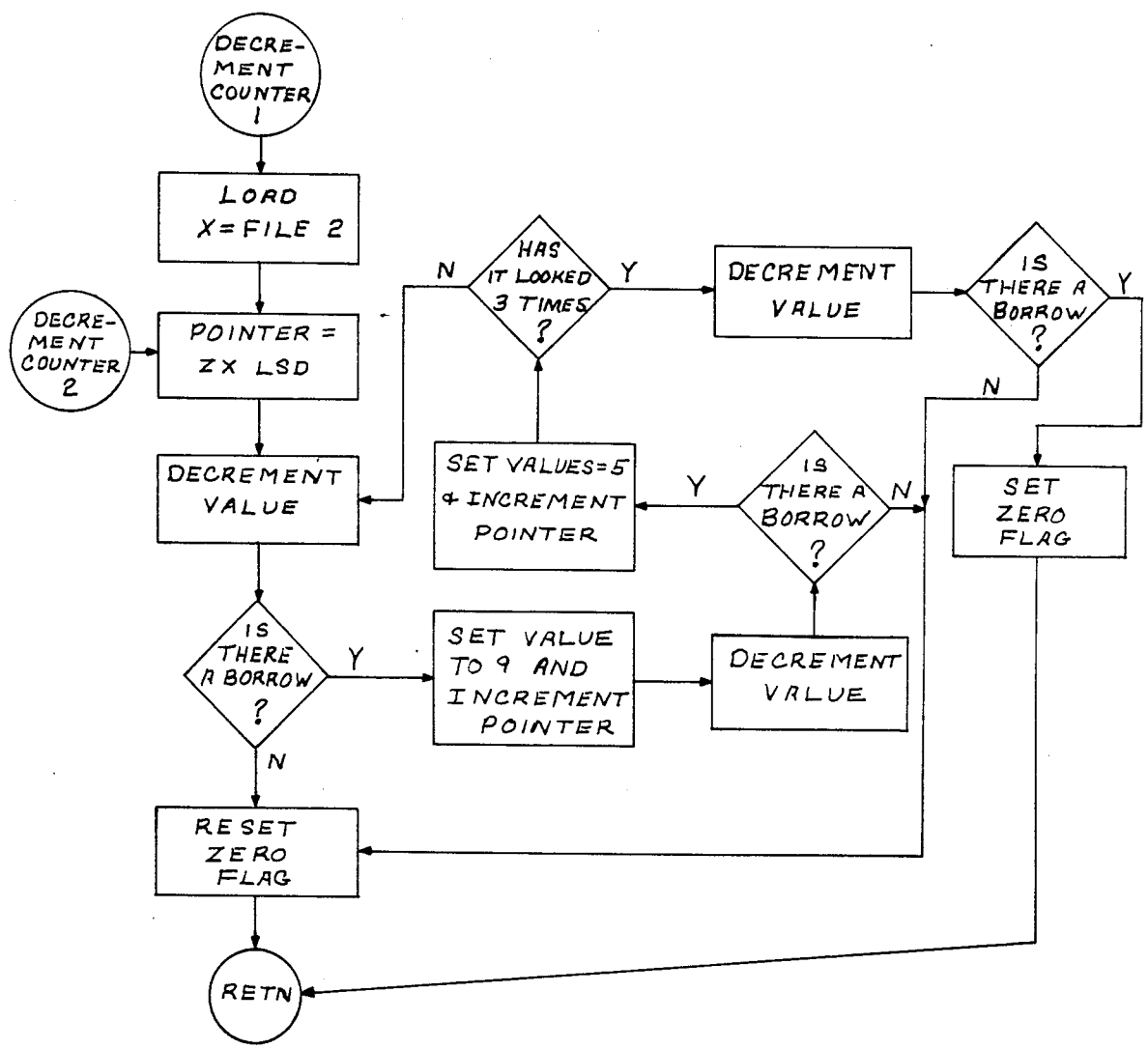

FIG. 4g; LITON; LITOFF. The LITON/LITOFF routine in FIG. 4g is a subroutine called by the program as indicated by "turn on light/turn off light" boxes elsewhere in the flow chart. What this routine does is basically set or reset flags to indicate whether the light should be on, or dim, or off. It will first check the random off flag. If it is set, this routine will reset flags that will result in the light being turned off. If the random off flag is not set, the microprocessor will turn on the dim switch output. If the dim switch is turned on, an on flag will be set and a bright flag reset. If the dim switch is turned off, it will set both the bright and on flags and return to the program where it was called.

Also in FIG. 4g is a flow chart for decrement counter routines. This has both decrement counter 1 and decrement counter 2. Decrement counter 1 is used for all timing except for the random time. It will point to the counter in the X-register called file 2 and will point to the zero cross least significant digit. It will decrement this value. If there is a borrow, it will set this value to 9 and increment to the next nibble in memory. The routine will decrement this value and ask, "is there a borrow?" If there is, the microprocessor will set this value to 5 and increment to the next nibble. If this has not been executed three times, it will decrement this value. If there is a borrow, the routine will loop around again. If at any time in this loop there is no borrow after a decrement, the routine will reset a zero flag and return. If the program goes through all three loops and there is a borrow still, the program will set the zero flag. What this will do is indicate to the calling program that the counter has timed out and the time that was loaded into this counter has expired.

In summary, there are two parts of the zero cross input: during the first half, the load check and auto-mode routines are executed; during the second half, key scan and random routines are executed.

Appendix A shows the program used to implement one embodiment of the invention.

In one embodiment of this invention, the following components were used.

| QTY | NUMBER | DESCRIPTION |
|---|---|---|
| 1 | U1 | MICROCOMPUTER-TMS1700/MP3000 |
| 1 | R9 | 680 OHM ½ W FUSABLE RESISTOR |
| 1 | C1 | .68 UF 250 WV CAPACITOR |
| 1 | CR2 | RECTIFIER DIODES-1N4001 |
| 1 | C2 | 200 UF 10V CAPACITOR |
| 1 | CR1 | 10 V ZENER DIODE |
| 5 | CR4-CR8 | SIGNAL DIODES-1N914 OR EQUIV. |
| 2 | C12,C13 | .001 UF CAPACITOR |
| 1 | LED2 | RED LED |
| 1 | LED1 | YELLOW LED |
| 1 | C3 | 100 PF CAPACITOR |
| 1 | C4 | 1.0 UF CAPACITOR |
| 1 | R5 | 39K OHM RESISTOR |
| 2 | R1,R2 | 100K OHM RESISTOR |
| 1 | R4 | 2.4K OHM RESISTOR (I LIMIT, RED LED) |
| 1 | R3 | 1.0K OHM RESISTOR (I LIMIT, YELLOW LED) |
| 1 | S1 | TRIAC |
| 1 | P1 | PHOTORESISTOR-P-1312A |
| 1 | R6 | 250K OHM TRIMPOT |
| 1 | R7 | 1.5K OHM RESISTOR |
|  | FOR TABLE MODEL ADD: | |
| 3 | CR9,CR10,CR12 | SIGNAL DIODES-1N914 OR EQUIV. |

While specific embodiments of this invention have been described, other embodiments of this invention will be obvious to those skilled in the automatic light control arts in view of this disclosure.

ATTACHMENT A

```
        TITLE  LMPTMR TMS1000
****************************************************
*       DIABLO PRODUCTS
*       LAMP ALERT
*       "ALERT5" FINAL.
*       10/1/82.
****************************************************
*REGISTERS*
************
*FILE 3
*******
ZX1REG  EQU     0       ;LOCATION OF ZERO CROSS REFERENCE
ZX2REG  EQU     1       ;LOCATION OF ZERO CROSS CHECK & INPUT
LITREG  EQU     2       ;LIGHT STATUS FLAGS, SECURITY MODE
TIMSET  EQU     3       ;ON DURATION VALUE WORKSPACE
DLYSET  EQU     4       ;DELAY TURNON VALUE WORKSPACE
KEYWRK  EQU     5       ;LOCATION OF KEYSCAN WORKSPACE
FLGREG  EQU     6       ;MISC FLAGS
FLAGS   EQU     7       ;MORE FLAGS
*******
*FILE 2  'DELAY TURN ON' AND 'ON TIME' COUNTER
*******
ZXLSD   EQU     0       ;ZERO CROSSING COUNTER
ZXMSD   EQU     1       ;
SECLSD  EQU     2       ;SECONDS COUNTER
SECMSD  EQU     3       ;
```

```
MINLSD  EQU     4       ;MINUTES COUNTER
MINMSD  EQU     5       ]
HOURS   EQU     6       ;HOURS COUNTER
MAX+FL  EQU     7       ;FLAG TO INDICATE THE COUNTER AT ZERO
*******
*FILE 1   'RANDOM COUNTER'
*******
*         ALL LOCATIONS ARE SPECIFIED THE SAME AS
*         THE COUNTER IN FILE 2 AND USE THE SAME EQUS
*******
*FILE 0
*******
RONLSD  EQU     0       ;RANDOM ON TIME COUNTER
RONMSD  EQU     1       ;
ROFFLS  EQU     2       ;RANDOM OFF TIME COUNTER
ROFFMS  EQU     3       ;
FOFLAG  EQU     4       ;FLAG REGISTER
SORCEP  EQU     6       ;SOURCE LOCATION POINTER FOR DATA TRANSFER
DESTP   EQU     5       ;DESTINATION POINTER FOR DATA TRANSFER
***********
*BIT DEF'N*
***********
*       (REG=ZX1REG OR ZX2REG)
LDSNSE  EQU     2       ;LOAD SENSE K INPUT BIT
ZXINP   EQU     3       ;ZERO CROSSING K INPUT BIT
*       (REG=ZX1REG, ZX2REG, OR KEYWRK)
K1      EQU     0       ;STORAGE BIT FOR K1 INPUT
K2      EQU     1       ;STORAGE BIT FOR K2 INPUT
*       (REG=LITREG)
ONOFFL  EQU     0       ;ON/OFF STATUS (1=ON, 0=OFF)
BRTFLG  EQU     1       ;DIM/BRIGHT STATUS (1=BRIGHT, 0=DIM)
SCRFLG  EQU     2       ;LOCATION OF SECURITY MODE FLAG
LEDFLG  EQU     3       ;LED STATUS (1=OFF [LIGHT], 0=ON [DARK])
*       (REG=FLGREG)
EOC     EQU     0       ;INDICATES THAT A TIMING CYCLE HAS ENDED
LSFLG   EQU     1       ;LOAD SENSE FLAG--PREVIOUS STATE OF INPUT
OK4ATO  EQU     2       ;IF SET % LOAD SENSE CHANGES 0->1, THEN AUTO MOD
AUTO    EQU     3       ;AUTO MODE FLAG
*       (REG=FLAGS)
DLYON   EQU     0       ;INDICATES IF IN DELAY TURNON ROUTINE
ONTIM   EQU     1       ;INDICATES IF TIMING THE LIGHT ON
DARK    EQU     2       ;INDICATES THAT IT IS DARK
FLASH   EQU     3       ;INDICATES LIGHT FLASH ON ENTRY TO AUTO
*       (MISREG)
ZERO    EQU     3       ;FLAG TO INDICATE THAT THE COUNTER HAS ELAPSED
*       (FOFLAG)
TEST    EQU     0       ;INDICATES THAT TEST TIMES TO BE LOADED
RNDOFF  EQU     1       ;INDICATES THAT THE LIGHT IS OFF IN SCRTY MODE
INITFL  EQU     2       ;INDICATES THE UNIT JUST POWERED UP
*************
*VALUE DEF'N*
*************
TRION   EQU     1       ;OUTPUT TO TRIAC GATE (02,03)
LEDON   EQU     2       ;LED OUTPUT PORT (00)
PHOTON  EQU     3       ;PHOTOCELL OUTPUT PORT (06)
SSTSON  EQU     4       ;SECURITY OUTPUT PORTS (07)
AUTLED  EQU     6       ;AUTO LED OUTPUT PORT (05)
TESTON  EQU     7       ;TEST JUMPER OUTPUT PORT (R7)
DIMON   EQU     7       ;DIM SWITCH OUTPUT PORT (R7)
*************
*X REG DEF'N*
*************
FILE0   EQU     0       ;X REGISTER 0
FILE1   EQU     1       ;X REGISTER 1
FILE2   EQU     2       ;X REGISTER 2
FILE3   EQU     3       ;X REGISTER 3
*
***************************************************
*                 OUTPUT PLA                       *
***************************************************
        OPLA
*OUTB   -0000=00000000
*OUTB   -0001=00000110
```

```
                    *OUTB   -0010=00000001
                    *OUTB   -0011=01000000
                    *OUTB   -0100=10000000
                    *OUTB   -0110=00100000
                    *OUTB   -----=00000000
                            ENDPLA
                    *************************************************
                    *
0  0   0 3B  PRIOR  TBIT1   AUTO    ;IF ALREADY IN AUTO MODE SKIP NEXT SECTION
0  0   1 B3         BR      TOAUTO
0  0   2 18         CALLL   LITON   ;SET FLAGS INDICATING LIGHT ON (DIM)
0  0   2 C0
0  0   4 46         TCY     FLGREG  ;THE CURRENT LOAD SENSE STATE IS HIGH,
0  0   5 3A         TBIT1   LSFLG   ;WAS THE PRIOR LOAD SENSE STATE HIGH?
0  0   6 BC         BR      TODCR2  ;YES, GO DECREMENT THE 2 SECOND COUNTER
0  0   7 32         SBIT    LSFLG   ;NO, SET THE LOAD SENSE STATE HIGH
0  0   8 39         TBIT1   OK4ATO  ,AND CHECK TO SEE IF IT IS OK TO ENTER AUTO
0  0   9 B3         BR      TOAUTO  ;YES, IT IS OK FOR AUTO MODE
0  0  10 31         SBIT    OK4ATO  ;NO, GET READY TO START LOOKING FOR AUTO AGAIN
0  0  11 1E         BL      LOAD2S  ;RESET 2 SECOND COUNTER
0  0  11 84
                    *
0  0  13 1E  TODCR2 BL      DECR2
0  0  13 85
                    *
                    *AUTO MODE
                    *---------
                    *       THE AUTO ROUTINE BASICALLY LOADS, DECREMENTS, AND
                    *       CHECKS COUNTERS. THESE COUNTERS TIME A DELAY AFTER
                    *       DARK IS SENSED, THEY TIME A USER PROGRAMMED DELAY
                    *       THAT HOLDS OFF TURNING ON THE LIGHT, AND THEY TIME
                    *       THE DURATION THAT THE LIGHT WILL BE ON. SECURITY
                    *       MODE FUNCTIONS, WHICH CONTROL RANDOM ON AND OFF
                    *       ARE HANDLED IN THE OTHER HALF CYCLE.
                    *
0  0  15 23  TOAUTO TYA             ;TURN ON AUTO LED (Y=FLGREG)
0  0  16 0A         TDO
0  0  17 4E         TCY     FLAGS
0  0  18 3B  AUTOMD TBIT1   FLASH   ;SEE IF THE LIGHT HAS FLASHED
0  0  19 97         BR      CHKCYC  ;YES, GO SEE IF IT HAS ENTERED A CYCLE
0  0  20 46         TCY     FLGREG  ;NO, IS IT ALREADY IN AUTO MODE?
0  0  21 3B         TBIT1   AUTO
0  0  22 B1         BR      GODEC   ;YES, GO DECREMENT AND TEST THE COUNTER
0  0  23 18         CALLL   LITON   ;TURN ON (DIM) THE LIGHT
0  0  23 C0
                    *
0  0  25 46         TCY     FLGREG  ;SET AUTO MODE FLAG
0  0  26 33         SBIT    AUTO
0  0  27 35         RBIT    OK4ATO
0  0  28 1E         BL      LOAD2S
0  0  28 84
                    *
0  0  30 3B  CHKCYC TBIT1   DLYON   ;CHECK TO SEE IF THE UNIT HAS ENTERED
0  0  31 B4         BR      CHKONT  ;A TIMING CYCLE. THIS HAPPENS IF THE FIXED
0  0  32 16         BL      CHKLED  ;TIME DELAY HAS ELAPSED. IF IT HAS ENTERED
0  0  32 8F
                    *                ;THE PHOTOCELL IS NO LONGER CHECKED.
                    *
0  0  34 14  GODEC  CALLL   DCRCTR  ;THIS SECTION DECREMENTS THE COUNTER
0  0  34 F0
0  0  36 3B         TBIT1   ZERO    ;IN THE ROUTINE THAT FLASHES THE LIGHT
0  0  37 AD         BR      TENDFL  ;ON ENTERING THE AUTO MODE. IF THE
0  0  38 1E  TOSTRT BL      START   ;FLASH HAS ENDED, GO TURN OFF THE LIGHT
0  0  38 BC
                    *
0  0  40 16  TENDFL BL      ENDFL
0  0  40 80
                    *
0  0  42 4E  CHKONT TCY     FLAGS   ;CHECK TO SEE IF THE UNIT IS TIMING
0  0  43 3A         TBIT1   ONTIM   ;"LIGHT ON"?
0  0  44 91         BR      TONCNT  ;YES, GO TO "LIGHT ON" TIMING ROUTINE
0  0  45 14         BL      DLYCNT  ;NO, GO TO "ON DELAY" TIMING ROUTINE
0  0  45 80
                    *
```

```
0 0 47 1B  TONCNT  CALLL  LITON
0 0 47 C0
0 0 49 14  ONCNT   CALLL  DCRCTR  >DECREMENT COUNTER TIMING "LIGHT ON"
0 0 49 F0
0 0 51 3B          TBIT1  ZERO    >ELAPSED?{
0 0 52 99          BR     KILITE
0 0 53 9B          BR     TOSTRT  >NO, KEEP LOOPING
                *
0 0 54 1E  KILITE  BL     TOSETE
0 0 54 AA
                *
0 0 56 3B  DRKLED  TBIT1  LEDFLG  >>>>>>>>>>>>>>>>
0 0 57 94          BR     TOLAST  >
0 0 58 23          TYA            >
0 0 59 0A          TDO            >>>>>>>>>>>>>>>>>
0 0 60 3C  TOLAST  LDX    FILE0
0 0 61 40          TCY    RONLSD
0 0 62 12          BL     LSTHLF
0 0 62 80
                *
                *
                *
0 1  0 3C  LITON   LDX    FILE0
0 1  1 42          TCY    FOFLAG
0 1  2 3A          TBIT1  RNDOFF
0 1  3 B5          BR     LITOFF
0 1  4 3F  LITON2  LDX    FILE3
0 1  5 4E          TCY    DIMON
0 1  6 0D          SETR
0 1  7 08          TKA
0 1  8 0C          RSTR
0 1  9 4A          TCY    KEYWRK
0 1 10 03          TAM
0 1 11 3A          TBIT1  K2
0 1 12 8E          BR     DIMIT
0 1 13 44          TCY    LITREG
0 1 14 30          SBIT   ONOFFL
0 1 15 32          SBIT   BRTFLG
0 1 16 98          BR     EXIT
                *
0 1 17 44  DIMIT   TCY    LITREG
0 1 18 30          SBIT   ONOFFL
0 1 19 AC          BR     PREXIT
                *
0 1 20 3F  LITOFF  LDX    FILE3
0 1 21 44          TCY    LITREG
0 1 22 34          RBIT   ONOFFL
0 1 23 36  PREXIT  RBIT   BRTFLG
0 1 24 0F  EXIT    RETN
                *
0 1 25 1E  LODRND  CALLL  CLRFIL
0 1 25 C9
0 1 27 3C          LDX    FILE0
0 1 28 42          TCY    FOFLAG
0 1 29 3A          TBIT1  RNDOFF
0 1 30 A3          BR     OFFOK
                *
0 1 31 3C  OKON    LDX    FILE0
0 1 32 46          TCY    SORCEP
0 1 33 60          TCMIY  RONLSD
0 1 34 8D          BR     RNDDES
                *
0 1 35 46  OFFOK   TCY    SORCEP
0 1 36 64          TCMIY  ROFFLS
0 1 37 42  RNDDES  TCY    FOFLAG
0 1 38 38          TBIT1  TEST
0 1 39 A9          BR     SAVRNS
0 1 40 4A          TCY    DESTP
0 1 41 62          TCMIY  MINLSD
0 1 42 A4          BR     RXFER
                *
0 1 43 4A  SAVRNS  TCY    DESTP
0 1 44 68          TCMIY  ZXMSD
0 1 45 22  RXFER   TMY            *Y=SOURCE POINTER
```

```
0 1 46 21            TMA
0 1 47 4A            TCY    DESTP
0 1 48 22            TMY
0 1 49 3E            LDX    FILE1
0 1 50 03            TAM
0 1 51 3C            LDX    FILE0
0 1 52 46            TCY    SORCEP
0 1 53 22            TMY
0 1 54 2B            IYC
0 1 55 21            TMA
0 1 56 4A            TCY    DESTP
0 1 57 22            TMY
0 1 58 2B            IYC
0 1 59 3E            LDX    FILE1
0 1 60 03  ENDLOD    TAM
0 1 61 0F            RETN
0 1 62 1E            BL     START
0 1 62 BC
                *
                *
0 2  0 38  DLYCNT TBIT1  DLYON  ;IS THE UNIT TIMING "DELAY LIGHT ON"
0 2  1 9E            BR    TRYDLY ;YES. GO DECREMENT THE DELAY ON COUNTER
0 2  2 F0            CALL  DCRCTR ;NO. DECREMENT THE FIXED DELAY COUNTER
0 2  3 3B            TBIT1 ZERO   ;HAS THE FIXED DELAY TIME EXPIRED?
0 2  4 BE            BR    LODDLY ;YES. GO ENTER THE DELAY ON ROUTINES
0 2  5 1E  GOTOST BL     START  ;NO, KEEP COUNTING
0 2  5 BC
                *
0 2  7 3F  LODDLY LDX    FILE3  >
0 2  8 4E         TCY    FLAGS  >INDICATE THAT UNIT IS TIMING "DELAY ON"
0 2  9 30         SBIT   DLYON  >
0 2 10 1C  GOLOAD BL     LODCNT >AND GO LOAD THE DELAY LIGHT ON VALUE
0 2 10 91
                *
0 2 12 F0  TRYDLY CALL   DCRCTR ;DECREMENT THE DELAY TURN ON COUNTER
0 2 13 3B         TBIT1  ZERO   ;HAS IT EXPIRED?
0 2 14 A7         BR     LIVLIT
0 2 15 9F         BR     GOTOST ;NO, KEEP WAITING.
                *
0 2 16 3F  LIVLIT LDX    FILE3
0 2 17 4E         TCY    FLAGS
0 2 18 32         SBIT   ONTIM  ;INDICATE UNIT IS TIMING LIGHT ON, AND
                                ;LOAD ON TIME VALUE.
0 2 19 3E         LDX    FILE1  ]
0 2 20 1E         CALLL  CLRFIL ]LOAD RANDOM TIME
0 2 20 C9
0 2 22 18         CALLL  OKON   ]
0 2 22 EE
0 2 24 B7         BR     GOLOAD
                *
0 2 25 3D  DCRCTR LDX    FILE2
0 2 26 40  DCRCT2 TCY    ZXLSD
0 2 27 2A  LOOPDC DMAN
0 2 28 AD         BR     RESTOR
0 2 29 69         TCMIY  9
0 2 30 2A         DMAN
0 2 31 AD         BR     RESTOR
0 2 32 6A         TCMIY  5
0 2 33 56         YNEC   6
0 2 34 82         BR     LOOPDC
0 2 35 2A         DMAN
0 2 36 AD         BR     RESTOR
0 2 37 4E         TCY    MAX+FL
0 2 38 33         SBIT   ZERO
0 2 39 A9         BR     EXITDC
                *
0 2 40 03  RESTOR TAM
0 2 41 4E         TCY    MAX+FL
0 2 42 37         RBIT   ZERO
0 2 43 0F  EXITDC RETN
                *
0 2 44 03  CONRND TAM
0 2 45 84         BR     STROFF
0 2 46 40  CNRND1 TCY    RONLSD
0 2 47 60         TCMIY  0
```

```
0 2 48 66              TCMIY   6
0 2 49 44  STROFF TCY  ROFFLS
0 2 50 2A              DMAN
0 2 51 A8              BR      EXITRN
0 2 52 69              TCMIY   9
0 2 53 2A              DMAN
0 2 54 70              ALEC    0
0 2 55 8A              BR      RESET2
0 2 56 A8              BR      EXITRN
0 2 57 44  RESET2 TCY  ROFFLS
0 2 58 60              TCMIY   0
0 2 59 64              TCMIY   2
0 2 60 90              BR      EXIT2
0 2 61 03  EXITRN TAM
0 2 62 16  EXIT2  BL   TOCONT
0 2 62 94
            *
            *
0 3  0 1E              BL      INIT
0 3  0 80
            *
0 3  2 3F  ZEROX  LDX  FILE3
0 3  3 40              TCY     ZX1REG ;Y=0
0 3  4 08              TKA
0 3  5 03              TAM            ;LOAD SENSE FLAG IS IN RAM 3,0 BIT 2
0 3  6 3B              TBIT1   ZXINP  ;TEST ZERO CROSSING INPUT
0 3  7 9C              BR      KHI    ;ZX INPUT HI, GO CHECK FOR LOW
            *                         ;ZX INPUT LOW, CHECK FOR HIGH
0 3  8 48  KLOW   TCY  ZX2REG ;Y=1
0 3  9 08              TKA
0 3 10 03              TAM
0 3 11 0F              RETN
0 3 12 3B              TBIT1   ZXINP
0 3 13 B3              BR      ZERONE ;0-->1 ZERO CROSS TRANSITION
0 3 14 BD              BR      KLOW
            *
0 3 15 4C  ZERONE TCY  PHOTON
0 3 16 1A              CALLL   GETVAL ;TURN ON PHOTOCELL
0 3 16 E2
0 3 18 3A              TBIT1   K2     ;TEST PHOTOCELL INPUT
0 3 19 AC              BR      SET    ;IF HIGH, GO SET LED ON/OFF FLAG
0 3 20 44              TCY     LITREG ;OTHERWISE, RESET LED ON/OFF FLAG
0 3 21 37              RBIT    LEDFLG
0 3 22 B0              BR      CHKLS
0 3 23 44  SET    TCY  LITREG ;SET LED ON/OFF FLAG
0 3 24 33              SBIT    LEDFLG
            *
0 3 25 FD  CHKLS  CALL KLOW
            *
0 3 26 44              TCY     LITREG
0 3 27 38              TBIT1   ONOFFL ;IS THE LIGHT TO BE ON?
0 3 28 F4              CALL    FIRETC ;YES, GO FIRE TRIAC
            *          CALL    CLROUT
0 3 29 48              TCY     ZX2REG
0 3 30 1E              BL      LSROOT ;NO, GO CHECK THE LOAD SENSE
0 3 30 B3
            *
0 3 32 FD  KHI    CALL KLOW
0 3 33 3B              TBIT1   ZXINP
0 3 34 9C              BR      KHI
            *                         ;1-->0 TRANSITION
0 3 35 44  ONEZER TCY  LITREG ;Y=2
0 3 36 3A              TBIT1   BRTFLG ;IS THE LIGHT TO BE BRIGHT?
0 3 37 F4              CALL    FIRETC ;YES, GO FIRE TRIAC
            *          CALL    CLROUT
0 3 38 4C              TCY     TIMSET
0 3 39 60              TCMIY   0      ;INITIALIZE TIMSET
0 3 40 1A              BL      KEYSCN
0 3 40 80
            *
0 3 42 48  FIRETC TCY  TRION  ;TURN ON
0 3 43 23              TYA
0 3 44 0A              TDO
```

```
0 3 45 0B  CLROUT CLO              ;THEN OFF THE TRIAC GATE
0 3 46 0F         RETN
                *
0 3 47 1E  LODCNT CALLL  LOAD2S    ;CLEARS FILE 2 AND RETURNS
0 3 47 C4
0 3 49 3F         LDX    FILE3
0 3 50 4E         TCY    FLAGS
0 3 51 3A         TBIT1  ONTIM     ;IS IT TIMING LIGHT ON?
0 3 52 B2         BR     SAVTIM
0 3 53 42         TCY    DLYSET
0 3 54 A5         BR     XFER
                *
0 3 55 4C  SAVTIM TCY    TIMSET
0 3 56 21  XFER   TMA
0 3 57 3C         LDX    FILE0
0 3 58 42         TCY    FOFLAG
0 3 59 12         BL     FINXFR
0 3 59 B2
                *
                *
0 4  0 2A  LSTHLF DMAN
0 4  1 8F         BR     OFFUP
0 4  2 69         TCMIY  9
0 4  3 2A         DMAN
0 4  4 78         ALEC   1
0 4  5 DD         BR     REON
0 4  6 14  OFFUP  BL     CONRND
0 4  6 92
0 4  8 14  REON   BL     CNRND1
0 4  8 88
                *
0 4 10 4E  ERANUP TCY    FLAGS
0 4 11 39         TBIT1  DARK
0 4 12 B9         BR     CHKAUT
0 4 13 8E         BR     STRTOR
                *
0 4 14 46  CHKAUT TCY    FLGREG
0 4 15 3B         TBIT1  AUTO
0 4 16 BA         BR     CHKSEC
0 4 17 1E  STRTOR BL     START
0 4 17 BC
                *
0 4 19 44  CHKSEC TCY    LITREG
0 4 20 39         TBIT1  SECFLG
0 4 21 A1         BR     RNDMOD
0 4 22 3C         LDX    FILE0
0 4 23 42         TCY    FOFLAG
0 4 24 36         RBIT   RNDOFF
0 4 25 8E         BR     STRTOR
                *
0 4 26 4E  RNDMOD TCY    FLAGS
0 4 27 3A         TBIT1  ONTIM
0 4 28 97         BR     GOCHON
0 4 29 8E         BR     STRTOR
                *
0 4 30 44  GOCHON TCY    LITREG
0 4 31 38         TBIT1  ONOFFL
0 4 32 A4         BR     RNONCY
                *
0 4 33 3E  TODECR LDX    FILE1
0 4 34 14         CALLL  DCRCT2
0 4 34 E1
0 4 36 3B         TBIT1  ZERO
0 4 37 B6         BR     TLDRND
0 4 38 8E         BR     STRTOR
                *
0 4 39 3C  TLDRND LDX    FILE0
0 4 40 42         TCY    FOFLAG
0 4 41 36         RBIT   RNDOFF
0 4 42 3E  CLRNLD LDX    FILE1
0 4 43 18         BL     LODRND
0 4 43 80
                *
```

```
0 4 45 3E  RNONCY LDX    FILE1
0 4 46 14         CALLL  DCRCT2
0 4 46 E1
0 4 48 3B         TBIT1  ZERO
0 4 49 93         BR     OFFCYC
0 4 50 8E         BR     STRTOR
                *
0 4 51 3C  OFFCYC LDX    FILE0
0 4 52 42         TCY    POFLAG
0 4 53 32         SBIT   RNDOFF
0 4 54 B4         BR     CLRNLD
                *
                *
0 4 55 38  FINXFR TBIT1  TEST    ;UNIT IN TEST MODE?
0 4 56 94         BR     TSTMOD
0 4 57 3D         LDX    FILE2   ;NO, DESTINATION OF KEY VALUE IS TO BE HOURS
0 4 58 46         TCY    HOURS
0 4 59 90         BR     OUTLOD
                *
0 4 60 3D  TSTMOD LDX    FILE2   ;YES, DESTINATION OF KEY VALUE IS TO BE
0 4 61 4C         TCY    SECMSD  ;10'S OF MINUTES
0 4 62 03  OUTLOD TAM
0 4 63 8E         BR     STRTOR
                *
                *
                *
                *KEYSCAN
                *-------
                *      THE KEY SCAN ROUTINE THAT FOLLOWS CHECKS ALL THE
                *      KEY EXCEPT THE DIM SWITCH  THIS INPUT WILL BE CHECKED
                *      IN THE LIGHT ON ROUTINE WHERE THE ON-BRIGHT FLAGS ARE SET
                *      THE KEY SCAN ROUTINE WILL EXIT WITH THE TIMER REGISTER
                *      (TIMREG) EQUAL TO THE VALUE OF THE ON TIME AND THE
                *      DELAY TURNON REGISTER (DLYREG) EQUAL TO THE VALUE OF THE
                *      DELAY TIME. SECURITY AND BRIGHT FLAGS ARE ALSO
                *      SET OR RESET BASED ON THE POSITIONS OF THE RESPECTIVE
                *      SWITCHES.
                *
0 5  0 6F  KEYSCN TCMIY  15      ;INITIALIZE DELAY ON COUNTER TO 15
0 5  1 40         TCY    ZX1REG  ;P=0
0 5  2 2F         CLA
0 5  3 03         TAM            ;START SCANNING @ R1
0 5  4 OF         RETN
                *
                *CHECK LIGHT ON TIME SWITCHES
                *
0 5  5 0D  SWVALU SETR
0 5  6 08         TKA
0 5  7 0C         RSTR           ;LOAD THE SWITCH VALUES INTO RAM
0 5  8 4A         TCY    KEYWRK
0 5  9 03         TAM
0 5 10 OF         RETN
                *
0 5 11 38  SCAN1  TBIT1  K1
0 5 12 82         BR     SCAN2A  ;THIS IS THE KEY
0 5 13 4C         TCY    TIMSET
                *
0 5 14 21  UPDVAL TMA
0 5 15 0E         IA
0 5 16 03         TAM
0 5 17 40         TCY    0
0 5 18 21         TMA
0 5 19 0E         IA
0 5 20 03         TAM
0 5 21 22         TMY
0 5 22 OF         RETN
0 5 23 7A         ALEC   5
0 5 24 9F         BR     SWVALU
                *
0 5 25 4C         TCY    TIMSET
0 5 26 60         TCMIY  0
                *
0 5 27 C0  SCAN2A CALL   KEYSCN
```

```
0 5 28 DF  SCAN2B CALL   SWVALU
0 5 29 3A         TBIT1  K2
0 5 30 8D         BR     TSTTST ;THIS IS THE KEY
0 5 31 42         TCY    DLYSET
0 5 32 F9         CALL   UPDVAL
0 5 33 7A         ALEC   5
0 5 34 85         BR     SCAN2B
                *
0 5 35 42         TCY    DLYSET
0 5 36 60         TCMIY  0
0 5 37 4E  TSTTST TCY    TESTON
0 5 38 DF         CALL   SWVALU
0 5 39 38         TBIT1  K1
0 5 40 A9         BR     TSTING
0 5 41 16         BL     NOTEST
0 5 41 B9
                *
0 5 43 3C  TSTING LDX    FILE0
0 5 44 42         TCY    FOFLAG
0 5 45 30         SBIT   TEST.
0 5 46 3F         LDX    FILE3
                *
0 5 47 42  TSTSEC TCY    SSTSON ;SET UP TO CHECK THE SECURITY SWITCH
0 5 48 23  GETVAL TYA
0 5 49 0A         TDO
0 5 50 08         TKA
0 5 51 0B         CLO
0 5 52 4A         TCY    KEYWRK
0 5 53 03         TAM
0 5 54 0F         RETN
                *
0 5 55 38         TBIT1  K1
0 5 56 94         BR     FIXED
0 5 57 44         TCY    LITREG
0 5 58 31         SBIT   SECFLG
0 5 59 90         BR     TODARK
                *
0 5 60 44  FIXED  TCY    LITREG
0 5 61 35         RBIT   SECFLG ;SET THE SECURITY MODE FLAG
                *
0 5 62 10  TODARK BL     DRKLED
0 5 62 A5
                *
0 6  0 18  ENDFL  CALLL  LITOFF ;AND SET THE FLAG INDICATING THE LIGHT
0 6  0 F5
0 6  2 4E         TCY    FLAGS  ;HAS BEEN FLASHED
0 6  3 33         SBIT   FLASH
                *
0 6  4 44  CHKLED TCY    LITREG
0 6  5 3B         TBIT1  LEDFLG ;IS IT LIGHT(LEDFLG SET IF IT IS LIGHT
0 6  6 AB         BR     TORSET ;YES, GO RESET SOME FLAGS
                *
0 6  7 3F  LITB4? LDX    FILE3  ;OTHERWISE, CHECK TO SEE IF WAS DARK THE
0 6  8 4E         TCY    FLAGS  ;LAST PASS
0 6  9 39         TBIT1  DARK   ;DARK?
0 6 10 A3         BR     CHKEOC ;YES, GO SEE IF IT'S FINISHED A CYCLE
0 6 11 31         SBIT   DARK   ;NO, REMEMBER THAT IT'S DARK
                *
0 6 12 3C  TOLDFD LDX    FILE0
0 6 13 42         TCY    FOFLAG
0 6 14 38         TBIT1  TEST   ;IF IN THE TEST MODE,
0 6 15 B8         BR     TO2SEC ;GO LOAD 2 SECONDS, OTHERWISE
                *
0 6 16 1E  LOADFD CALLL  LOAD25
0 6 16 C4
0 6 18 4A         TCY    MINMSD
0 6 19 68         TCMIY  1
0 6 20 8B         BR     STRTOK
                *
0 6 21 4E  TORSET TCY    FLAGS
0 6 22 39         TBIT1  DARK
0 6 23 AE         BR     PRELOD
0 6 24 14         CALLL  DCRCTR
```

```
0 6 24 F0
0 6 26 3B          TBIT1   ZERO
0 6 27 ED          CALL    RESET
0 6 28 35          RBIT    DARK
0 6 29 1C  STRTOK  BL      ZEROX
0 6 29 83
                *
0 6 31 35  PRELOD  RBIT    DARK
0 6 32 9E          BR      TOLDFD
                *
0 6 33 1E  TO2SEC  BL      LOAD2S
0 6 33 84
                *
0 6 35 46  CHKEOC  TCY     FLGREG  ;SEE IF THE UNIT HAS FINISHED IT'S TIMING
0 6 36 38          TBIT1   EOC     ;CYCLE.
0 6 37 8B          BR      STRTOK  ;IF IT HAS GO BACK TO THE START & WAIT FOR LIGHT
0 6 38 10          BL      CHKONT
0 6 38 B4
                *
0 6 40 3F  RESET   LDX     FILE3
0 6 41 46          TCY     FLGREG
0 6 42 34          RBIT    EOC
0 6 43 4E  REFLGS  TCY     FLAGS
0 6 44 34          RBIT    DLYON   ;NOT DARK - RESET DLYON, ONTIM, DARK FLAGS
0 6 45 36          RBIT    ONTIM
0 6 46 0F          RETN
                *
0 6 47 3C  SETEOC  SBIT    EOC
0 6 48 E9          CALL    REFLGS
0 6 49 8B          BR      STRTOK
                *
0 6 50 3C  NOTEST  LDX     FILE0
0 6 51 42          TCY     FOFLAG
0 6 52 34          RBIT    TEST
0 6 53 3F          LDX     FILE3   ;THE UNIT IS NOT IN TEST MODE
0 6 54 4C          TCY     TIMSET  ;SO,
0 6 55 21          TMA             ;DOUBLE THE VALUE OF THE TIME SET
0 6 56 25          AMAAC           ;SWITCH TO CORRESPOND TO THE
0 6 57 03          TAM             ;NUMBER OF HOURS THAT ARE SET
0 6 58 1A          BL      TSTSEC
0 6 58 91
                *
0 6 60 3F  TOCONT  LDX     FILE3
0 6 61 12          BL      ERANUP
0 6 61 B7
                *
                *
0 7  0 3C  INIT    LDX     FILE0
0 7  1 C9          CALL    CLRFIL
0 7  2 40          TCY     RONLSD
0 7  3 6E          TCMIY   7       ;
0 7  4 6A          TCMIY   5       ;INITIALIZE RANDOM NUMBER GENERATORS
0 7  5 6A          TCMIY   5       ;
0 7  6 68          TCMIY   1       ;
0 7  7 31          SBIT    INITFL
0 7  8 3E          LDX     FILE1
0 7  9 C9          CALL    CLRFIL
0 7 10 C4          CALL    LOAD2S  ;WILL CLEAR FILE 2
0 7 11 3F          LDX     FILE2
0 7 12 C9          CALL    CLRFIL
                *
0 7 13 1C  START   BL      ZEROX
0 7 13 83
                *
                *LOAD SENSE ROUTINE
                *
0 7 15 39  LSROOT  TBIT1   LDSNSE  ;IS THE LOAD SENSE INPUT HIGH? Y=1
0 7 16 8D          BR      TOPRIO  ;YES, GO CHECK THE PRIOR LOAD SENSE STATE
0 7 17 3C          LDX     FILE0
0 7 18 42          TCY     FOFLAG
0 7 19 60          TCMIY   0       ;CLEAR FLAG
0 7 20 18          CALLL   LITOFF  ;NO, RESET FLAGS TO INDICATE LIGHT OFF
0 7 20 F5
```

```
0 7 22 46            TCY     FLGREG  ]
0 7 23 36            RBIT    LSFLG   ;RESET LOAD SENSE AND AUTO FLAGS
0 7 24 37            RBIT    AUTO    ]
0 7 25 34            RBIT    EOC     ]
0 7 26 4E            TCY     FLAGS
0 7 27 60            TCMIY   0       ;CLEAR FLAGS
0 7 28 14  DECR2     CALLL   DCRCTR  ;CALL ROUTINE TO DECREMENT THE COUNTER
0 7 28 F0
0 7 30 3B            TBIT1   ZERO    ;HAS 2 SECONDS ELAPSED?
0 7 31 B8            BR      NOAUTO  ;YES, THERE WILL BE NO AUTO THIS TIME
0 7 32 BC            BR      START   ;NO, GO BACK AND WAIT FOR A ZEROX
                 *
0 7 33 3F  NOAUTO    LDX     FILE3
0 7 34 46            TCY     FLGREG  ;RESET THE FLAG THAT GIVES THE OK TO
0 7 35 35            RBIT    OK4ATO  ;ENTER AUTO ON THE NEXT LOAD SENSE 0-1
0 7 36 BC            BR      START
                 *
0 7 37 3C  TOPRIO    LDX     FILE0
0 7 38 42            TCY     FOFLAG
0 7 39 39            TBIT1   INITFL
0 7 40 A4            BR      GTOAUT
0 7 41 3F            LDX     FILE3
0 7 42 46            TCY     FLGREG
0 7 43 10            BL      PRIOR
0 7 43 80
                 *
0 7 45 35  GTOAUT    RBIT    INITFL
0 7 46 3F            LDX     FILE3
0 7 47 10            BL      TOAUTO
0 7 47 B3
                 *
0 7 49 3D  LOAD2S    LDX     FILE2
                 *
0 7 50 2F  CLRFIL    CLA
0 7 51 4E            TCY     7
0 7 52 03  CLR0      TAM
0 7 53 2C            DYN                     ;CLEAR X FILE (NEEDS ACC=0)
0 7 54 A6            BR      CLR0
0 7 55 0F  RETFIL    RETN
                 *
0 7 56 44            TCY     SECLSD
0 7 57 6C            TCMIY   3
0 7 58 BC            BR      START
                 *
0 7 59 18  TOSETE    CALLL   LITOFF  ;YES, TURN OFF LIGHT
0 7 59 F5
0 7 61 46            TCY     FLGREG
0 7 62 16            BL      SETEOC
0 7 62 91
                 *
                     PAGE    0  8
                     PAGE    0  9
                     PAGE    0  A
                 *
0 E  0 1E            BL      INIT
0 E  0 80
                 *
                     PAGE    0  C
                     PAGE    0  D
                     PAGE    0  E
                 *
0 F  0 1E            BL      INIT
0 F  0 80
                 *
```

We claim:

1. Structure comprising
means, electrically connectable to a power supply, for supplying electric power to a lamp, said lamp containing a light source;
a switch for turning on and off said light source, said means for supplying comprising:
means for sensing the arrival of nighttime;
means for operating said structure in an automatic mode including
means for automatically turning on the lamp on the expiration of a first selected time period after the arrival of nighttime;
means for automatically turning off the lamp on the expiration of a second selected time period after the lamp has been turned on;
means for operating said structure in a manual mode; and
means for converting said structure from the manual mode to the automatic mode.

2. Structure as in claim 1 wherein said
means for converting said structure from the manual mode to the automatic mode comprises
means for sensing the rapid turning of said switch on then off and then on within a selected time period, thereby to convert said system from the manual mode of operation to the automatic mode of operation.

3. Structure as in claim 1 including
means for indicating that the structure is in an automatic mode of operation.

4. Structure as in claim 3 including
means for allowing a user to adjust the degree of darkness at which said structure detects the arrival of nighttime.

5. Structure as in claim 4 including
means for additionally delaying the turning on of said lamp following the detection of nighttime and the expiration of said first selected time period by a third selected time period.

6. Structure as in claim 5 wherein said third selected time period corresponds to any one of a plurality of different time delays.

7. Structure as in claim 6 wherein said plurality of different time delays comprise a zero delay, a one hour delay, a two hour delay, a three hour delay and a four hour delay.

8. Structure as in claim 1 including
means for randomly turning on and off said lamp during the second selected time period.

9. Structure as in claim 1 including
means for preventing said lamp from being turned on automatically after the expiration of darkness until the expiration of darkness has been detected for a third selected time period.

10. Structure as in claim 1 including
means for dimming said lamp during the time said lamp is on.

11. Structure as in claim 10 wherein said power supply comprises a source of alternating current and said means for dimming includes means for supplying power to said lamp during only one half of each cycle of said alternating current and wherein said structure includes an internal direct current power supply supplied by said source of alternating current.

12. Structure as in claim 11 wherein said means for automatically turning on the lamp and said means for automatically turning off the lamp comprise
a triac, and
means for triggering said triac twice each cycle of said alternating current.

13. Structure as in claim 12 wherein said means for triggering includes means for triggering said triac only after sufficient time has elapsed in each half cycle of said alternating current to ensure sufficient holding current to said triac during the positive and negative halves of each cycle of alternating current.

14. Structure as in claim 4 wherein said means for adjusting the degree of darkness at which said structure detects the arrival of nighttime includes
means for producing an indication to the user of the darkness level at which the system detects the arrival of nighttime.

15. Structure as in claim 1 wherein said power supply comprises a source of alternating current and said structure includes means for restarting said structure in the automatic mode following a failure of said alternating current.

16. Structure as in claim 15 including
means for automatically correcting the sequence of operations of said structure to the proper sequence within twenty-four hours following the restarting of said structure following a power failure.

17. Structure as in claim 1 wherein said means for sensing the arrival of nighttime comprises a photoelectric cell, the impedance of which increases significantly in response to nightfall thereby to provide a signal to said means for supplying to initiate the automatic control of said light.

18. Structure as in claim 18 including means for signaling to the user that the system is in an automatic mode of operation by turning the light off automatically after a selected time duration in response to the rapid turning off, on, off and on of the manual on-off switch associated with said light.

19. A system comprising
means for controlling automatically or manually the turning on and off of a light having a manual on-off switch associated therewith and
means for setting said means for controlling into an automatic mode of operation or a manual mode of operation in response to a user operating said manual on-off switch in a specified manner, where said means for setting comprises:
means responsive to the user operating said manual on-off switch to set said system in a manual mode of operation in response to the user turning off and then turning on said light by manipulating said manual on-off switch and
means for converting said sustem from the manual mode of operating to the automatic mode of operation in response to the user turning said manual on-off switch rapidly in sequence on, off and on.

* * * * *

UNITED STATES PATENT AND TRADEMARK OFFICE
CERTIFICATE OF CORRECTION

PATENT NO. : 4,575,659

DATED : March 11, 1986

INVENTOR(S) : Donald E. Pezzolo, James W. Pfeiffer, Thomas E. Corde

It is certified that error appears in the above—identified patent and that said Letters Patent is hereby corrected as shown below:

Col. 3, line 52, "ot" should read --to--.

Col. 10, line 60, delete "is" and substitute --flag is set and--.

Col. 36, line 38, "18" should read --19--.

Col. 36, line 58, "sustem" should read --system--.

Signed and Sealed this

Eighteenth Day of August, 1987

*Attest:*

DONALD J. QUIGG

*Attesting Officer*  *Commissioner of Patents and Trademarks*

Notice of Adverse Decisions in Interference

In Interference No. 102,093, involving Patent No. 4,575,659, D. E. Pezzolo, J. W. Pfeiffer and T. E. Corder, SENSOR TIMER FOR LAMPS, final judgment adverse to the patentees was rendered December 14, 1989, as to claims 1, 3, 4, 8, 10-15, 17 and 18.

*(Official Gazette February 20, 1990)*